United States Patent [19]

Hudson et al.

[11] Patent Number: 4,650,978

[45] Date of Patent: Mar. 17, 1987

[54] OFF LINE CASH CARD SYSTEM AND METHOD

[75] Inventors: Robert M. Hudson, Palm Beach; Alberto Fernandez, Hialeah, both of Fla.

[73] Assignee: RMH Systems, Inc., Miami, Fla.

[21] Appl. No.: 829,982

[22] Filed: Feb. 18, 1986

Related U.S. Application Data

[63] Continuation-in-part of Ser. No. 694,472, Jan. 23, 1985, abandoned, which is a continuation of Ser. No. 615,708, May 30, 1984, abandoned, which is a continuation of Ser. No. 263,206, May 13, 1981, abandoned, which is a continuation-in-part of Ser. No. 93,538, Nov. 13, 1979, abandoned.

[51] Int. Cl.$^4$ .............................................. G06K 15/30
[52] U.S. Cl. ................... 235/380; 235/381; 235/494; 235/379; 340/825.33
[58] Field of Search ............ 235/379, 381, 492, 493, 235/437, 438, 455, 380, 382; 250/569; 340/825.33, 825.34, 825.35

[56] References Cited

U.S. PATENT DOCUMENTS

| | | | |
|---|---|---|---|
| 3,792,236 | 2/1974 | Dubras et al. | 235/437 |
| 4,013,894 | 3/1977 | Foote et al. | 340/825.34 |
| 4,197,986 | 4/1980 | Nagata | 235/379 |
| 4,309,990 | 12/1981 | Atalla | 235/380 |
| 4,362,928 | 12/1982 | Sheldon | 235/375 |
| 4,395,628 | 7/1983 | Silverman et al. | 235/382 |
| 4,417,138 | 11/1983 | Pfeiffer | 235/492 |
| 4,423,415 | 12/1983 | Goldman | 340/825.34 |
| 4,501,957 | 2/1985 | Perlman | 235/379 |
| 4,529,870 | 7/1985 | Chaum | 235/380 |
| 4,546,242 | 10/1985 | Stockburger et al. | 235/454 |

Primary Examiner—Robert G. Lev
Attorney, Agent, or Firm—Cushman, Darby & Cushman

[57] ABSTRACT

A "bank" cash card system for handling fund transfer transactions between a payor and a payee having a magnetic "hysteresis" security arrangement. A cash card has a magnetic stripe on which the available cash balance, the identification and security information are scramble recorded. A transaction register machine reads data from the card, carrys out the transaction and records the new account balance on the card. The modified information is "restored" on the card is in the form of a rescrambled code. The transaction register machine also includes a magnetic tape of the cassette type or disk for storing each transaction thereon for further processing of the information at a remote data processing center. The transaction register machine further includes a main keyboard on the side of the payee for displaying the cash balance, entering the total amount of the sale and recording the new cash balance on the card. The main keyboard is responsive to the card holder's or customer's keyboard which has a slot for insertion of the card for verification by entering the correct identification number known only to the card holder. A random surface pattern on a given portion of the card is preferably scanned to produce a digital number uniquely identifying the card.

29 Claims, 23 Drawing Figures

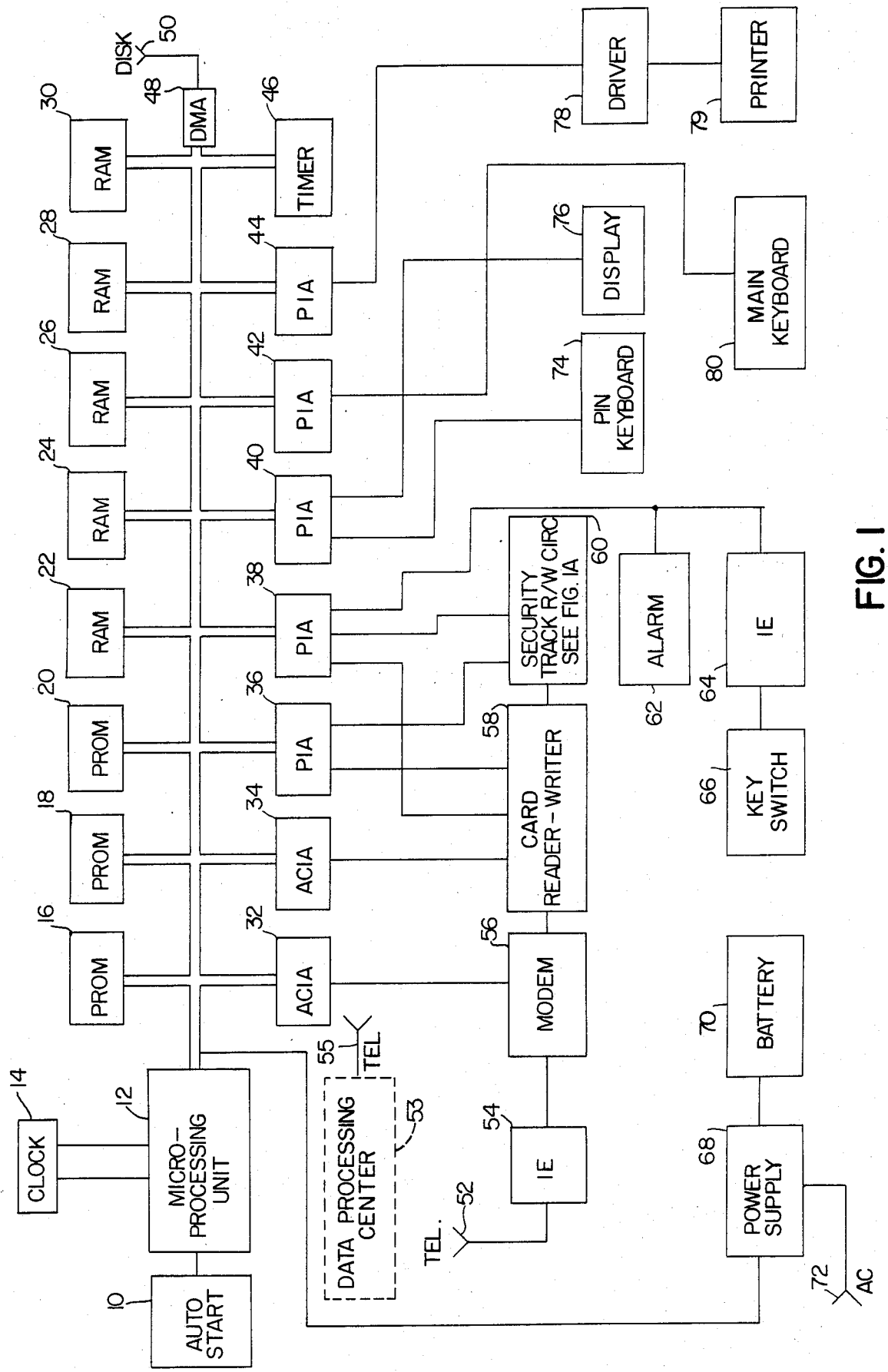
FIG. I

FIG. 16

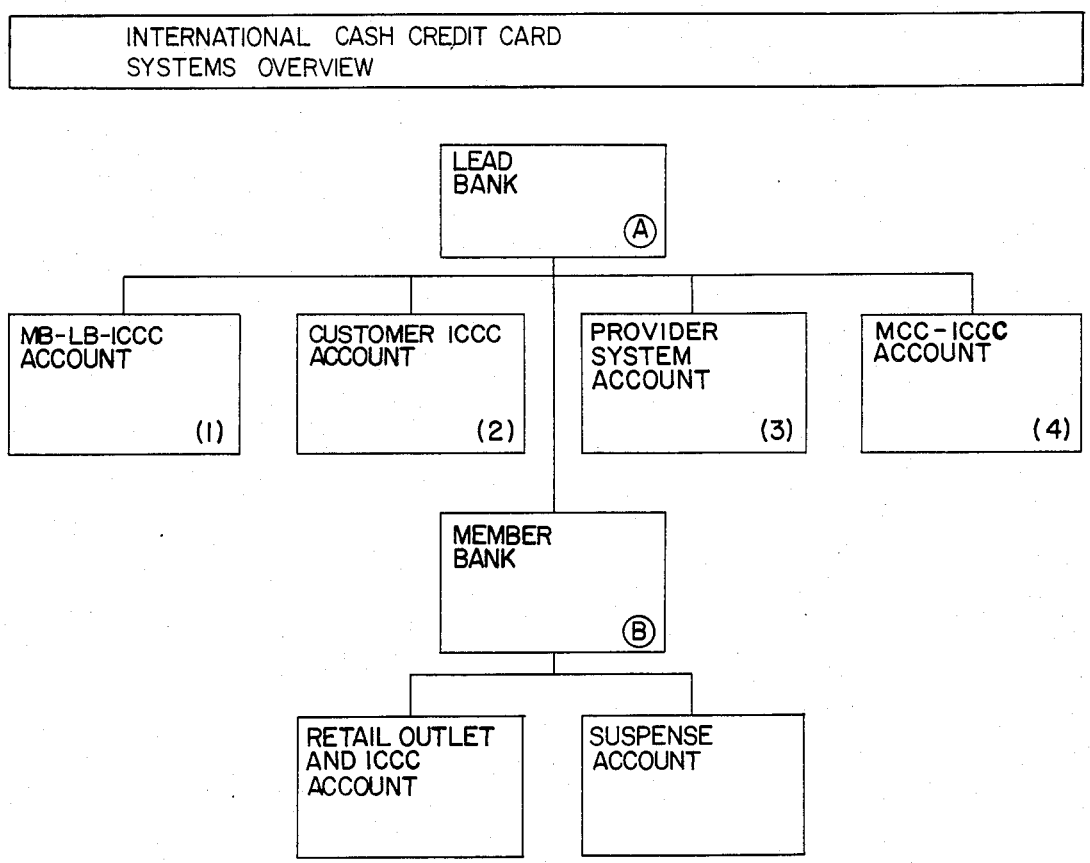

INTERNATIONAL CASH CREDIT CARD SYSTEMS OVERVIEW

Ⓐ LEAD BANK - CHASE MANHATTAN BANK; HAS FOLLOWING ACCOUNTS:
    (1) JOINT ACCOUNT - BETWEEN LEAD AND MEMBER BANK.
    (2) CUSTOMER ACCOUNT - SEPARATE ACCOUNT FOR EACH INDIVIDUAL BELONGING TO ICCC SYSTEM; EARNING 5-1/4% INTEREST.
    (3) MAJOR CREDIT CARD ACCOUNT - SEPARATE JOINT ACCOUNT FOR EACH CREDIT CARD COMPANY BELONGING TO ICCC SYSTEM.
    (4) RMH SYSTEMS ACCOUNT - EARNING 5-1/4% INTEREST.

Ⓑ MEMBER BANK - (ONE IN EACH CITY) HAS FOLLOWING ACCOUNTS:
    (1) RETAIL ACCOUNT - SEPARATE ACCOUNT FOR EACH RETAIL OUTLET (RO) BELONGING TO ICCC SYSTEM
    (2) SUSPENSE ACCOUNT - USED AS CLEARING ACCOUNT WITH LEAD BANK.

Ⓒ TERMS DEFINED
    (1) TR - TRANSACTION REGISTER; LOCATED AT EACH RETAIL OUTLET.
    (2) TM - TELEPHONE MODEM BY WHICH TRANSACTIONS ARE TRANSMITTED.

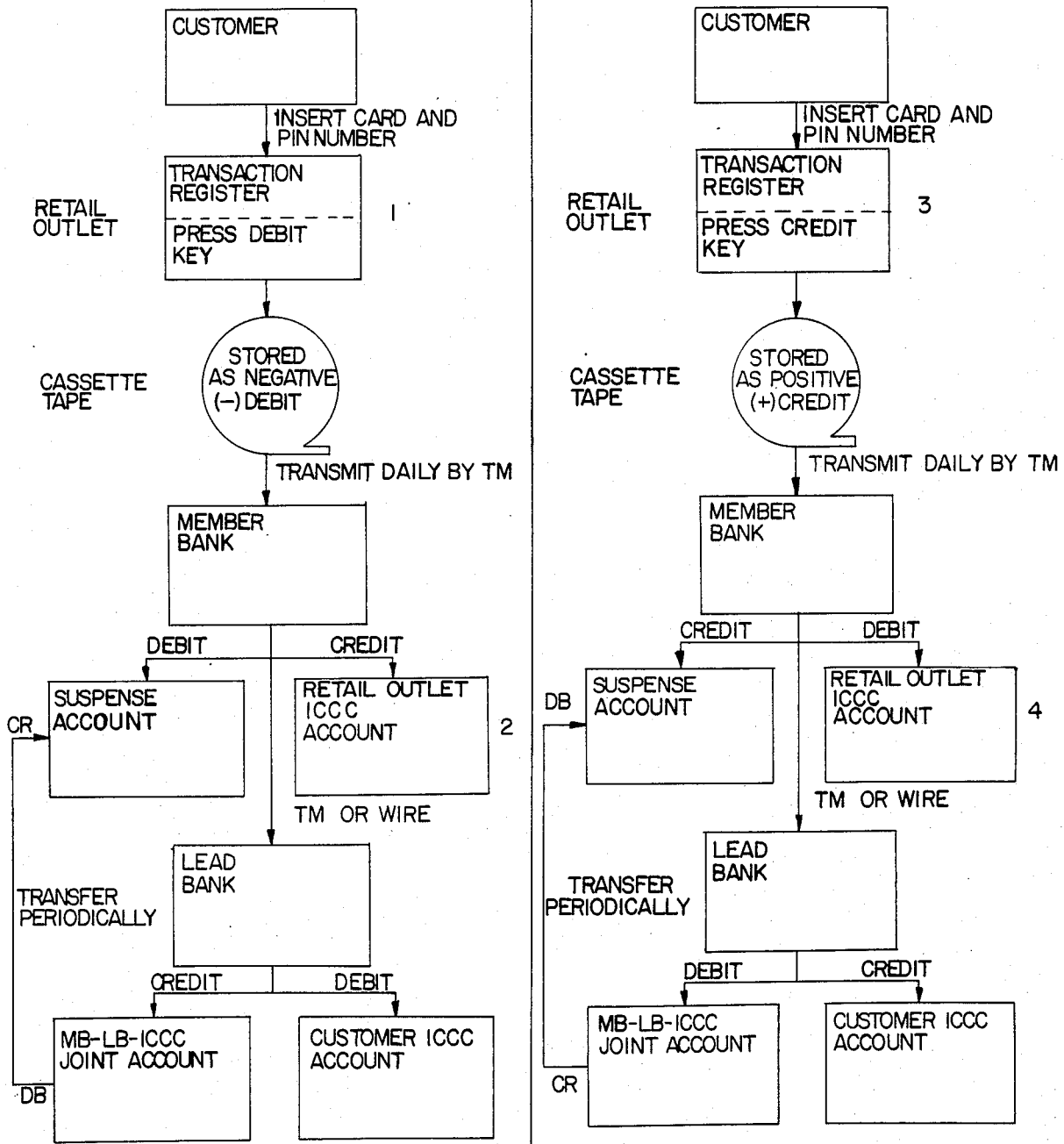

OFF LINE CASH CARD SYSTEM AND METHOD

RELATED APPLICATIONS

This application is a continuation-in-part of Ser. No. 694,472 filed Jan. 23, 1985 which was a file wrapper continuation of Ser. No. 615,708 filed May 30, 1984 which was a file wrapper continuation of Ser. No. 263,206 filed May 13, 1981 which was a continuation-in-part application of Ser. No. 93,538, filed Nov. 13, 1977 all now abandoned.

BACKGROUND OF INVENTION

This invention relates in general to banking cards, and more specifically to cash card systems. The invention provides an "off-line" system for the transfer of funds in commercial, financial and trade sales transactions in which the transferee does not communicate with the fund holder at the time of a transaction.

Recent trends have pointed to the development of efficient electronic tools which eliminate the need for the use of cash, cut down on operating costs and speed the transfer of funds in every day business transactions requiring the exchange of money or checks for the purchase of goods, payment of services and any other transactions of similar character, and all this with complete security and a minimal risk of error or fraud.

Systems heretofore developed have certain limitations in that they are costly, complicated and cumbersome, the manufacturing, installation and maintenance costs are relatively high and the systems have limited use and high cost.

"On-line" systems in which each transaction is communicated to a central computer of course provide high reliability but are too expensive for practical use. "Off-line" systems in which transactions are stored at each terminal and periodically delivered or transmitted to a central facility are less expensive but lack the security and reliability of "on-line" systems.

U.S. Pat. No. 3,845,277—Voss shows a prior art "off-line" system that seems to be representative of the state of the art.

SUMMARY OF THE INVENTION

The present invention provides an "off-line" cash card system that is efficient, secure and relatively inexpensive to provide and operate. Furthermore, the system is highly secure.

It is relatively less complex that known "off-line" systems and is both easy and inexpensive to operate and easily adaptable for universal use. The system provided by this invention can completely eliminate the use of cash money, invoices, multicarbons, monthly bills, payroll checks, deposit slips, mailing costs, reduce personnel-time-load-cost, balance book ledgers and all other paper with the exception of the customers receipt after each credit/debit transaction. The customer can acquire cash and/or purchases to the limit of their cash and credit balances for all commercial transactions by using a plastic card which can carry other selected major credit cards out of a possible 256 selections, up to a limit of 80 cards, thereby reducing the number of credit cards and/or wallet-load to one (1) card/person. Making it more convenient to carry and use and with which unauthorized deposits, and withdrawals make fraud or tampering, in the event the card is stolen or lost, practically impossible.

The basic components of the systems of the present invention are a cash card which is preferably of conventional plastic material containing a magnetic stripe on which the available cash balance, the owner's account number, credit and security information are recorded, and a transaction register which performs all the functions of a standard cash register including recording the amount of money received and exhibiting the amount of cash sale, and which also can read coded information from the card, store the information read, and encipher new information onto the cash card, updating the cash card in accordance with the transaction.

The cash card system provided by the present invention includes a novel "hysteresis" security arrangement. Each card is scanned upon presentation to read a numeric string which had undergone a random "mutation" when previously recorded onto the magnetic stripe. This numeric string, which can be read any number of times but cannot be accurately copied or re-recorded, serves as one of the enciphering keys for the data stored on the remainder of the magnetic stripe and enables the detection of certain efforts to invade the security of the system.

The transaction register records each cash transaction on a mass storage device, such as a magnetic disk, for later processing at a data processing central unit, with stored information being transmitted by telephone via a modem. Transmission preferably takes place automatically under timer control. The data processing center includes a computer, a disk file system and a printer for processing the information of the transaction register's disk and maintaining permanent accounts adjusted according to the cash card system transactions of the present invention.

To improve security by making copying as difficult as possible, a new numeric string enciphering key is recorded onto the magnetic stripe each time the card is used and this new key is then used to encipher the data to be stored on the magnetic stripe.

These and other features and advantages of the present invention will be made more clear by the following detailed description of the presently preferred embodiment of the invention, read in conjunction with the accompanying drawings.

BRIEF DESCRIPTION OF THE DRAWINGS

FIG. 1 is a general block diagram of the cash card transaction system of the present invention;

FIG. 16 is a block diagram showing the relationship among the various banks and accounts within the cash card system;

FIG. 17 is a flow diagram illustrating transaction processing for debits including purchases and cash withdrawls;

FIG. 18 is a flow diagram illustrating transaction processing for credits including returned items and deposits;

DETAILED DESCRIPTION OF PREFERRED EMBODIMENT

General Description

Figure 1A:
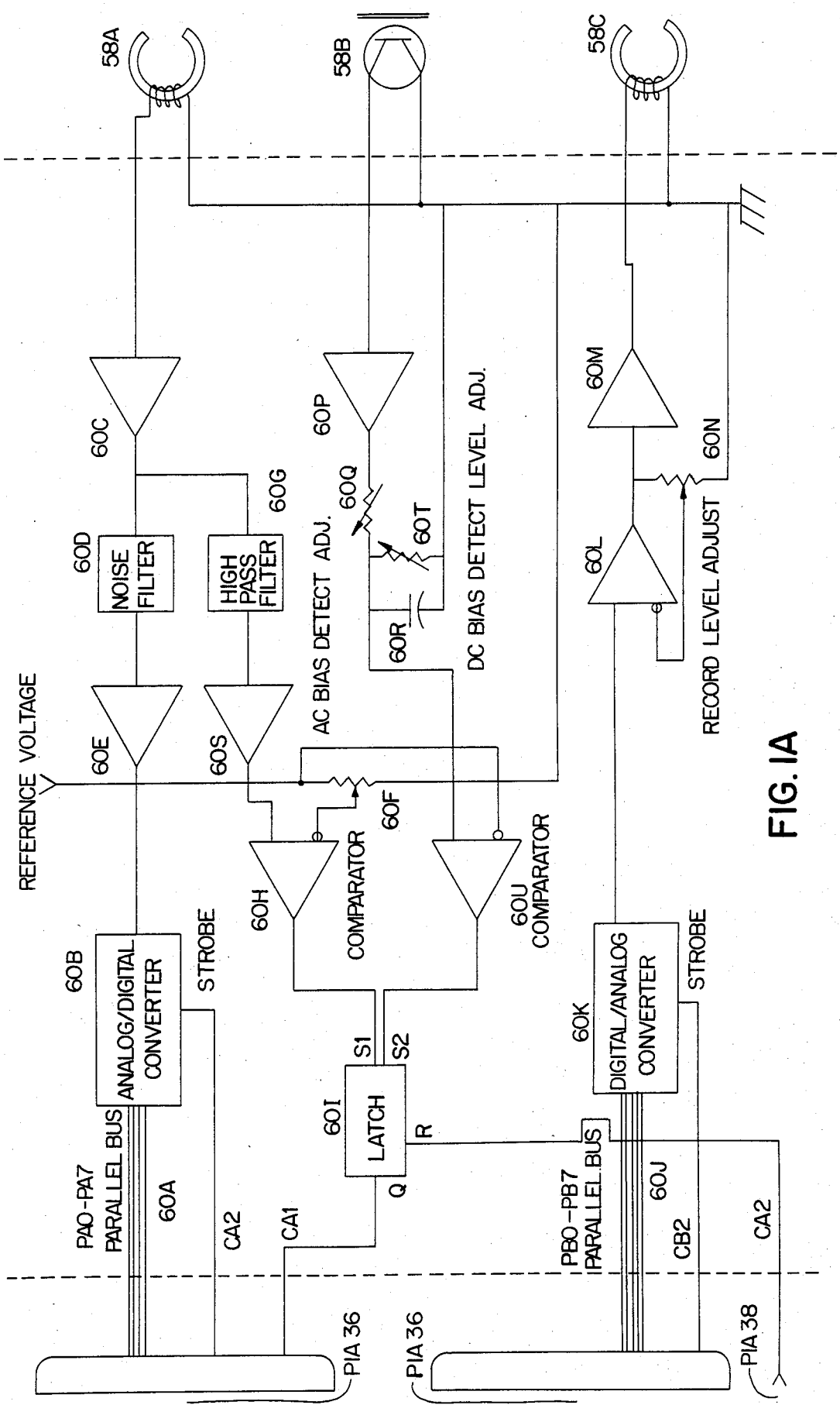
FIG. 1A is a detailed block diagram of circuit 60 shown in FIG. 1.

The electronic fund transfer system of the present invention will be referred to as the International Cash/-Credit Card (ICCC) system. A general block diagram of the system is set forth in FIG. 1.

An power-on-reset circuit 10 activates the system which in turn activates a microprocessing unit 12 setting the transaction register machine in operation. The presently preferred microprocessor for use in microprocessing unit 12 is the Motorola 6800. A clock 14 generates pulses for the microprocessor 12 and therefore for the entire computing system.

Programmable Read Only Memory (PROM) components 16, 18, and 20, are programmed with a real time operating system, bootstrap and utility routines. A number of Random Access Memory (RAM) units 22, 24, 26, 28, and 30 are provided to instructions for the main program, enciphering and deciphering algorithms, random number generating routines, an temporary data for each cash card transaction which can be transferred to magnetic disk 50 for storage.

RAM units 22-30 are battery powered so that their contents will not be lost when the transaction register is turned off. This allows the most critical parts of the security system software to be loaded into RAM at the factory rather than stored in the magnetic disk. The entire microprocessor circuit is encapsulated in plastic in such a way that any attempt to access the microprocessor bus causes all power to be cut off to RAM and thus all sensitive software or data to be erased.

The card reader/writer 58 is an industry standard type such as the AMP model 211 consisting of a magnetic card transport mechanism, dual track read/write heads, motor and position control logic circuits, and a logic board which converts the standard F/2F Aiken codes into serial binary data. In this invention either the standard ATA/IATA Track 1 or the ABA Track 2 are used as the data track and Track 3 is used as the security track. The read/write heads over track 3 are connected directly to circuit 60. A Hall-effect read head 58B is also positioned over track 3 and connected directly to circuit 60.

Asynchronous Communications Interface Adapters (ACIA) 32 and 34 are the modules which couple microprocessing unit 12 to the modem 56 and the card reader/writer 58. Parallel Interface Adapters (PIA) 36 and 38 are used to control the card reader/writer 58 and either read or generate the analog security track using the security track read/write circuit 60. Microprocessor 12 uses ACIAs 32 and 34 to serialize and transfer data between the microprocessor bus and the modem 56 and the card reader/writer 58 data track. Circuit 60 is used to process the signals to or from the security track heads and is shown in detail in FIG. 1A.

Peripheral Interface Adapters (PIA) 40, 42 and 44 allow microprocessor 12 to control the PIN keyboard 74, display 76, main keyboard 80, and printer driver 78 and its associated printer 79.

A timer 46 causes the microprocessor 12 to periodically transfer data to a remote data processing center 53. Timer 46 is also used as a utility timer by the microprocessor 12. A Direct Memory Access (DMA) 48, allows data to be transferred directly from memory to a disk 50 or from the disk to memory without going through the microprocessor 12.

The cash card system may be connected to a telephone line outlet 52 through the Interface Electronic (IE) module 54 connected to a Modulator/Demodulator (Modem) 56 which converts digital information signals from microprocessor 12 through ACIA 32 into analog or audio tones which can be transmitted over the telephone line through outlet 52 to a typical data processing center 53 connected to a telephone outlet 55.

An alarm 62 connected to PIA 38 and IE 64 is provided for sending a "beep" signal warning of error, such as the card has not been inserted correctly, keys jammed, machine overflow, etc.

PIN keyboard 74 is connected independently from the main keyboard 80, the function of both of which are described below. Display 76, connected to PIA 40, is provided for displaying information in numerical and-/or written form transmitted thereto by signals generated by the microprocessor 12. Driver 78 connected to PIA 44 conditions the signal level to the necessary strength to drive printer 79, which prints text upon receiving instructions from microprocessor 12. A key switch 66 turns on or off the power for operation of keyboards 74 and 80, display 76, driver 78 and printer 79. A power supply 68 converts the a.c. voltage from the current of line outlet 72 into the required voltage for the transaction register unit. A battery 70 stores energy for back-up in the event a power failure occurs in the power supply 68.

FIG. 1A is a more detailed block diagram of circuit 60 shown in FIG. 1. Circuit 60 receives signals from a reproduce head 58A and a Hall-effect head 58B and provides a record signal to a record head 58C. PIA 36 receives signals on a bus 60A from an analog/digital converter 60B which is controlled by a strobe signal on a strobe line CA2. Reproduce head 58A provides its signal to a preamplifier 60C which provides an amplified signal via a noise filter 60D to a reproduce operational amplifier 60E and which provides a signal to the non-inverting input of a second operational amplifier 60S through a high pass filter 60G. The output of operational amplifier 60S is coupled to the non-inverting input of comparator 60H.

Variable resistor 60F provides an adjustable reference voltage to the inverting input of comparator 60H through its wiper arm. One end of resistor 60F is coupled to a fixed voltage reference source the other end is coupled to ground. The output of comparator 60H is coupled to one of the inputs of latch 60I. The output of latch 60H is coupled to the CA1 input line of PIA 36 thereby providing the microprocessor an indication of the presence of AC or DC bias in the magnetic card stripe security track. The output of operational amplifier 60E is coupled to the analog input of analog/digital converter 60B which outputs the eight bit digital value of the signal from reproduce head 58A to PIA 36 through bus 60A whenever it receives a strobe pulse from line CA2.

The output of Hall-effect head 58B is coupled to the non-inverting input of operational amplifier 60P which provides an amplified signal through variable resistor 60Q to the non-inverting input of comparator 60U. The output of operational amplifier is also coupled to variable resistor 60T and capacitor 60R which form an adjustable low-pass filter along with variable resistor 60Q.

The output of comparator 60U is coupled to an input of latch 60I, providing PIA 36 line CA1 an indication of the presence of DC bias in the magnetic card stripe. The output of PIA 36 is coupled via a bus 60J to a digital/analog converter 60K, which is strobed by a signal on a line CB2 from PIA 36. The output of digital/analog converter 60K is coupled to the non-inverting input of an operational amplifier 60L, the output of which is coupled to a record driver amplifier 60M.

The output of record amplifier 60M is coupled to the coil of record head 58C. The other side of the coil of 58C, as with 58A and 58B, is coupled to ground. A variable resistor 60N has one end coupled to the output of operational amplifier 60L and its other end coupled to ground. The wiper arm of variable resistor 60N is coupled to the inverting input of operational amplifier 60L. In operation, resistor 60N is adjusted so that it controls the negative feedback to amplfier 60L so that the output of record driver 60M is between 16% and 90% of the media working range (S/N to saturation).

Figure 2:
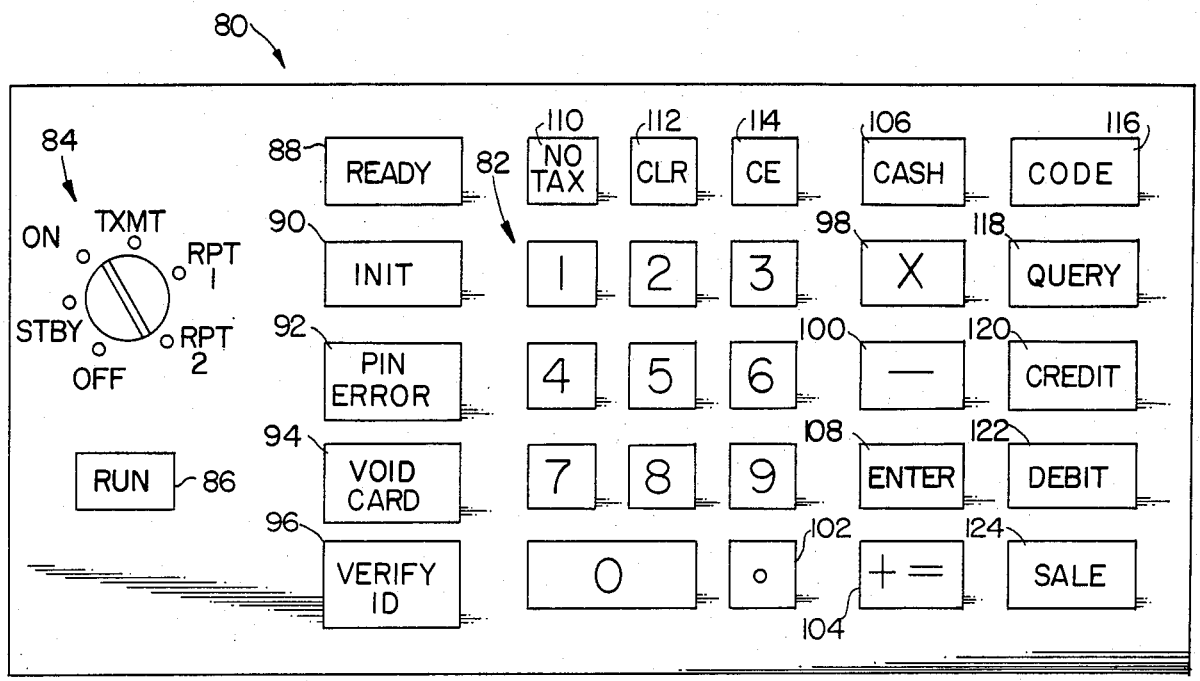
FIG. 2 is a front view of a main keyboard panel of the cash card system which keyboard is used only by an authorized staff member of a retail outlet.

As shown if FIG. 2, main keyboard 80 is used solely by the seller or payee and includes a plurality of keys, as designated generally by numeral 82, Keys 82 are marked with numerals from 1 to 9 and 0, for entering the amounts of the cash transactions. Keyboard 80 is also provided with an on-off switch, generally designated by the numeral 84, as well as contact points marked STBY, TXMT, RPT(1) and RPT(2). When the switch 84 is on TXMT contact it activates data transmission to the bank via the telephone modem 56 after the RUN key indicator 86 is pushed. Indicators are provided, namely, RUN 86, READY 88, INIT, initiator 90, (PIN) "X" 98, "−" 100, "." 102, "+=" 104, CASH 106, ENTER 108, NO TAX 110, CLR 112, CE 114, CODE 116, QUERY 118, CREDIT 120, DEBIT 122 and SALE 124. As it is obvious, all these keys are employed for conducting the cash card transactions according to the system of this invention and are operated by the seller or payee.

Figure 3:
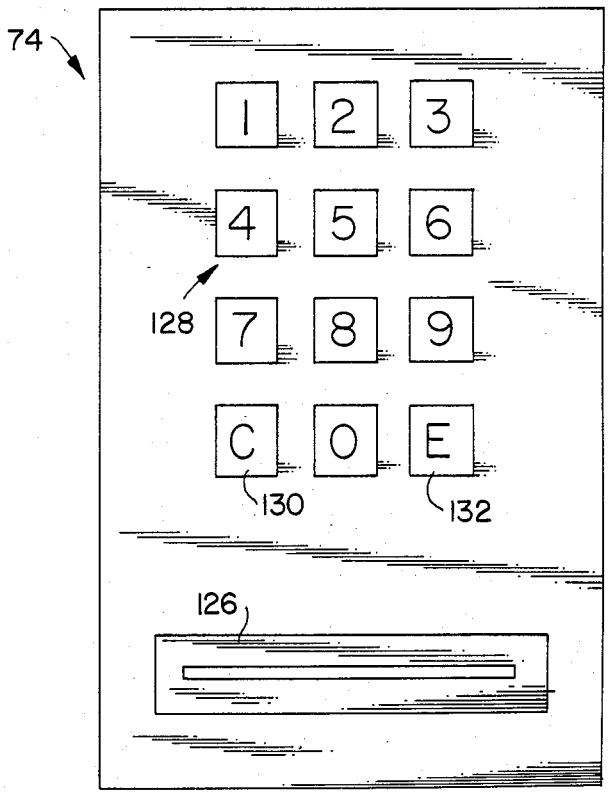
FIG. 3 is a front view of a keyboard panel of the cash card system which keyboard is used only by the card holder.

FIG. 3 shows PIN Keyboard, generally designated by reference numeral 74, including a plurality of keys 128, marked by numerals from 1 to 9 and 0, for entry of the personal identification number (PIN) by the card number or payor. The card is inserted into a slot 126 provided thereon. A key 130 marked "C" is used for clearing the entry and a key 132 marked "E" is used to signal the transaction register that the PIN number has been keyed in. PIN keyboard 74 is operated only by the card holder in secrecy for security purposes.

Figure 4:
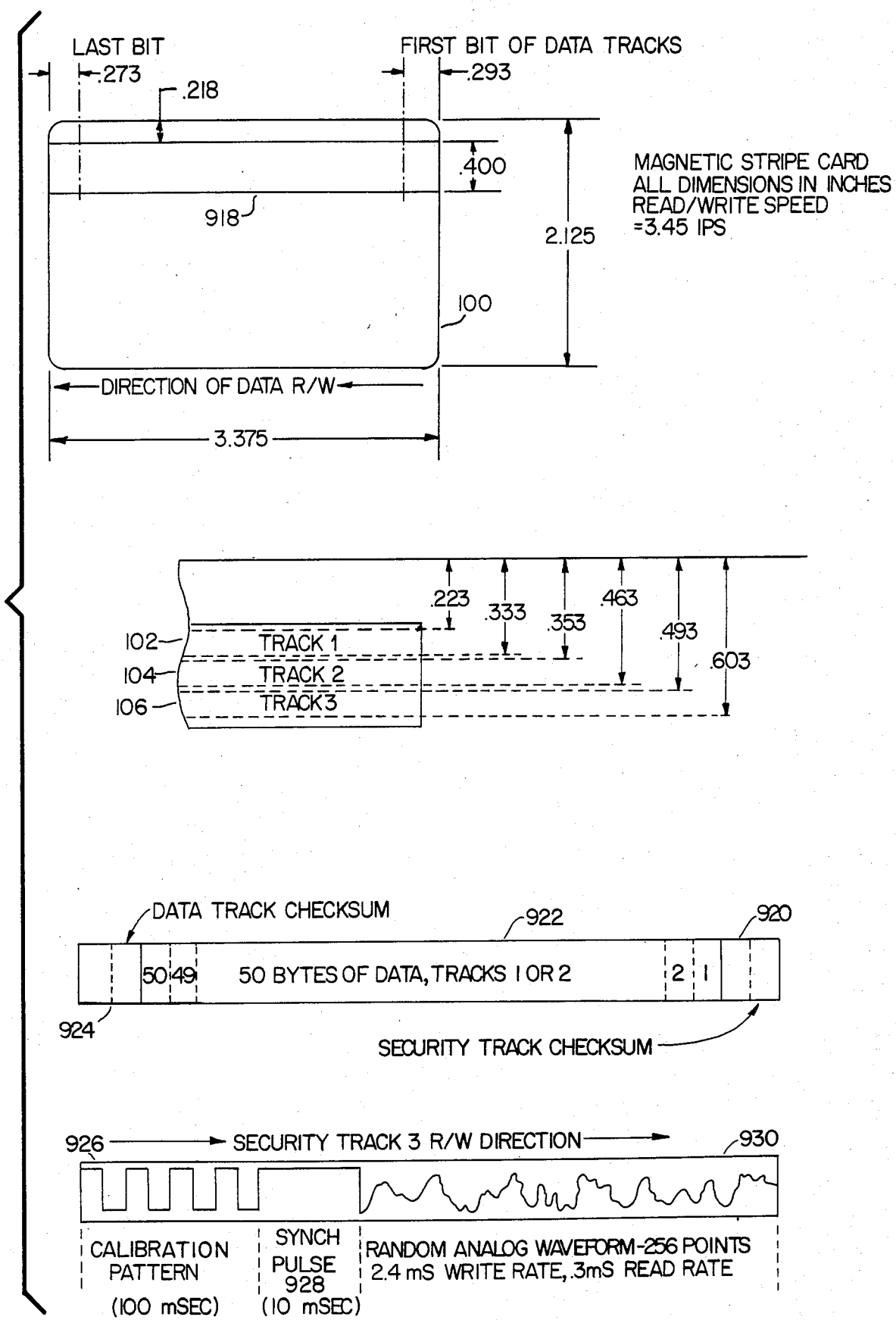
FIG. 4 is a schematic diagram of a plastic cash card of the type employed in the system of the present invention.

FIG. 4 illustrates the configuration of the cash card used in this invention. The cash card 100 contains a magnetic stripe 918. Information is recorded onto the magnetic stripe on either security track 106 or data tracks 102 and 104. The Data tracks contain a total of 54 bytes and are recorded using standard ABA or IATA formats. The first two bytes of the data track (920) contain a 16 bit checksum of the digitized pattern recorded on the security track. This checksum is used to detect a read error and repeat the read process if required. This checksum is not encrypted. The next 50 bytes on the data track (922) constitute the data or message to be stored on the card. It is encrypted according to a method that is described in Program Listing 1. The first two bytes of this data field (922) contain the hex pattern AA55. This pattern is used to determine if the decryption procedure was successful. Any error in the PIN number, Data Track, or the Security Track will prevent the data track from being decrypted hence this pattern will not appear. Following the data field is recorded a two byte checksum (924). This checksum is used to detect errors in reading the data track. The security track 3 contains three different fields. The first field (926) contains a calibration pattern produced by recording a square wave pattern of a standard level using no bias. It is used to compensate for card aging and mechanical positioning errors. The second field (928) consists of a single 10 milisecond pulse used to indicate the start of the security field. The last field is the security field consisting of 256 points of analog data recorded using no bias as explained previously. Each point has a duration of 2.4 miliseconds. When the security field is read, it is read at a rate eight times faster than the record rate and each group of eight values is averaged to yield 256 points along the security field. When this security track ls recorded, the record procedure is repeated two or more times to result in a complex random analog waveform which when read, is used as one of the keys by the encryption/decryption algorithms described in program listing 1.

Summary of Operation

According to the cash card system of this invention, a person bearing a cash card may, in any combination, purchase items or services or obtain money, by transferring funds data from his cash card into the transactionb register disk of the appropriate establishment. As the cash card is used variable amounts of cash balances are recorded directly on the card, thereby completely eliminating the use of checks, cash money, credit cards and house charges. Immediate contact between the transaction register and the bank of either the card bearer or the establishment where the transaction register is located is eliminated. The system, therefore, always operates in a completely off-line mode and surpasses on-line systems as to speed, efficiency, cost and security.

As presently comtemplated, a person can acquire a cash card at any member bank (i.e., a bank subscribing to the cash card system through a lead bank which may secure any number of member banks) by depositing any amount of money in a special interest bearing account, to be called a card holder-ICCC account. This account cannot be diminished by a check or passbook but only by the use of the cash card. The card holder-ICCC account could be adminstered by the member bank according to the competitive policies of the member banks with regard to minimum balances, number of transactions and cost-fee of ICCC card on issue, as examples. The balance in the ICCC account is recorded on the cash card to be used at the various transaction registers located at the retail outlets in the community. The current balance will draw interest at $5\frac{1}{4}\%$, or the prevailing rate, at all times from the lead bank or ICCC computer and will continue to do so until all the money is spent through the ICCC cash card.

As the bearer uses his card, information regarding the appropriate amount of a transaction will be transferred to the transaction register disk and recorded. The information is later transmitted to the member bank, causing the transaction amount to be credited to the member retail outlet account. In turn, this information is electrically transmitted through the local bank to the card holder's account at the ICCC computer or lead bank for debit. In the event cash is desired, the card bearer receives cash instead of merchandise, but again transaction information is electronically transmitted as described above via the member banks, crediting the retail outlet and debiting the account of the card bearer held at the lead bank or ICCC computer, thus eliminiating the need for checks.

The ICCC card issued by the lead bank through the card bearer's member bank (or by direct mail through customer's application), has a magnetic stripe encoded with the person's name, ID number, and cash balance enciphered for security purposes. The system will not be activated for operation by a card unless the right PIN is entered into the transaction register. Also, the register will not operate unless circuit 60 is inserted in the transaction register for operation. In effect, the card holder walks out of the bank or any member establishment with the full amount on deposit in his pocket and is able to spend it as if it were cash, while still earning $5\frac{1}{4}\%$ interest, or the prevailing rate on 100% percent of the amount in this account.

Interest rates can also be earned on the balance of a customer's ICCC card. This can be accomplished at the transaction register (TR) with each transaction, or the interest earned can be sent by check to each customer quarterly, or the customer can go to the bank each quarter and use the bank TR for updating interest on the card. In a typical cash card transaction, the customer would select the items he wishes to purchase. At the sales counter he would insert his card 134 into the slot 126 of the special keyboard 74. The customer would then enter his PIN by pressing the proper keys 128. The cashier at the establishment would then press the query key 118 of the main keyboard 80 for setting a display, as at 76, of the customer's available cash balance. The cashier would then enter the amount of the sale, as with a standard cash register, which can calculate the price per item, the subtotal, the tax, the transaction fee and the total. After the total is displayed, the cashier presses the sale key 124.

If the PIN is correct and the balance sufficient, the transaction would be recorded by circuit 60 within the transaction register which also would print a sales slip showing the sale price, as at 79, write the new cash balance of the card after the transaction and the account number of the card, and would record on the card the new cash balance. If the customer had requested cash from his card account, the transaction would have been handled in the same manner as the sale, except that the debit key 122 would have been pressed instead of the sale key 124, eliminating the check, imprinter, multi-carbons and lost and stolen card pamphlet and other paper used by major credit cards.

The transaction register machine can also handle deposits by the customer into his card. For example, a customer can enter a store with his paycheck and request that the amount of the paycheck be credited to his card. The card would then be inserted in the slot 126 of the keyboard 74 and then the PIN would be entered by pressing the proper keys 128. The cashier would then enter the amount on the register by pressing the proper keys 82 and then would press the CREDIT key 120. Thus the customer's card would be updated with the new balance and a permanent record of the transaction would be recorded by circuit 60, eliminating the deposit slip.

Another feature of the transaction register machine is that by setting the control key 84 on RPT(1) or RPT(2) and pressing the RUN key 86, a report will be printed showing a summary of the daily transactions, which is kept by the retail outlet as a permanent record. This report will include the cash, ICCC card and major credit card transactions. The exact format of a report can be tailored for each retail outlet in the software of the transaction register. RPT(1) and RPT(2) represent settings for two different report formats which can be produced by a single transaction register.

Either daily or bi-weekly, the information stored on the disk 10 would be transmitted via modem 56 from the cash card transaction register outlet to the data processing center 53 of a member bank over the telephone line at 52. The member bank then processes the disk information with the necessary data processing equipment and sends the coded information to the international cash credit card (ICCC) processing center (ICCC computer) or lead bank. There the information on disk would be read and decoded, as it would be stored in a scramble code for security purposes, and the appropriate customer accounts would be credited or debited accordingly.

The data processing center computer, as designated by number 53, of a well known model and type, contains in a disk file, not shown, a record of every transaction made within the cash card system of the present invention. The ICCC computer or lead bank computer will automatically update the balance of each ICCC card bearer account as the new debit and credit information is received via the modems of various transaction registers. The lead bank or ICCC computer will automatically transfer funds between a "member bank-lead bank joint account," located at the lead bank, and a "member bank suspense account." The member bank in turn debits or credits the retail outlet accounts, as required to maintain the system in balance. A suspense account is primarily used to expedite immediate clearance of a transaction; it would not be required if the customer's account and the retail outlet's account were at the same bank.

For example, as shown in FIG. 17, if a customer purchased $100.00 of merchandise with his card at a member retail outlet, a record of the transaction would be recorded on the disk. When the information on the disk reaches the ICCC computer or Lead Bank, through the member retail outlet's bank computer, the card holder's account at the lead bank would be debited $100.00 and the member-lead bank-ICCC joint account credited $100.00. The Lead Bank or ICCC Computer would also automatically transfer the necessary funds, in this case $100.00, in the opposite direction from the member-lead bank-ICCC joint account (float) at the lead bank and credit the member Bank suspense account.

The member bank in turn would debit this suspense account and credit its customer, the retail outlet, the $100.00. The retail outlet is immediately credited, from the suspense account, at the member bank, prior to debiting customer account at the lead bank. This can all be done within minutes after the lead bank receives the transaction information. The lead bank computer or ICCC computer will further print out a daily report showing the status of the ICCC cash card system. This includes a list of cards which have been inactive for a long period of time, cards which have a zero balance, and cards which may have been altered, resulting in incorrect balances and deposits made fraudulently or in error.

The operator at the lead bank or ICCC computer data processing center can request any information or special reports on the international cash/credit card system (ICCC) operation from a member bank computer at any time, and vice-versa. Cards which have been lost or stolen can be reported to either the lead bank, member bank or ICCC computer at any time. If any transaction involving those cards is later detected, the computer will immediately issue a special warning report, electronically, to every transaction register at retail outlets through the member bank computer. Information about cards lost or stolen will be electronically transmitted instantly, in the same way, to all transaction register locations.

System Security

The security of the off-line system of the present invention is maintained by enciphering the data to be stored on the card's magnetic stripe, and storing the enciphered data using a random hysteresis method. In the presently perferred embodiment, this method will be used with magnetic stripe cards but it can be applied to any magnetic media.

Figure 6:
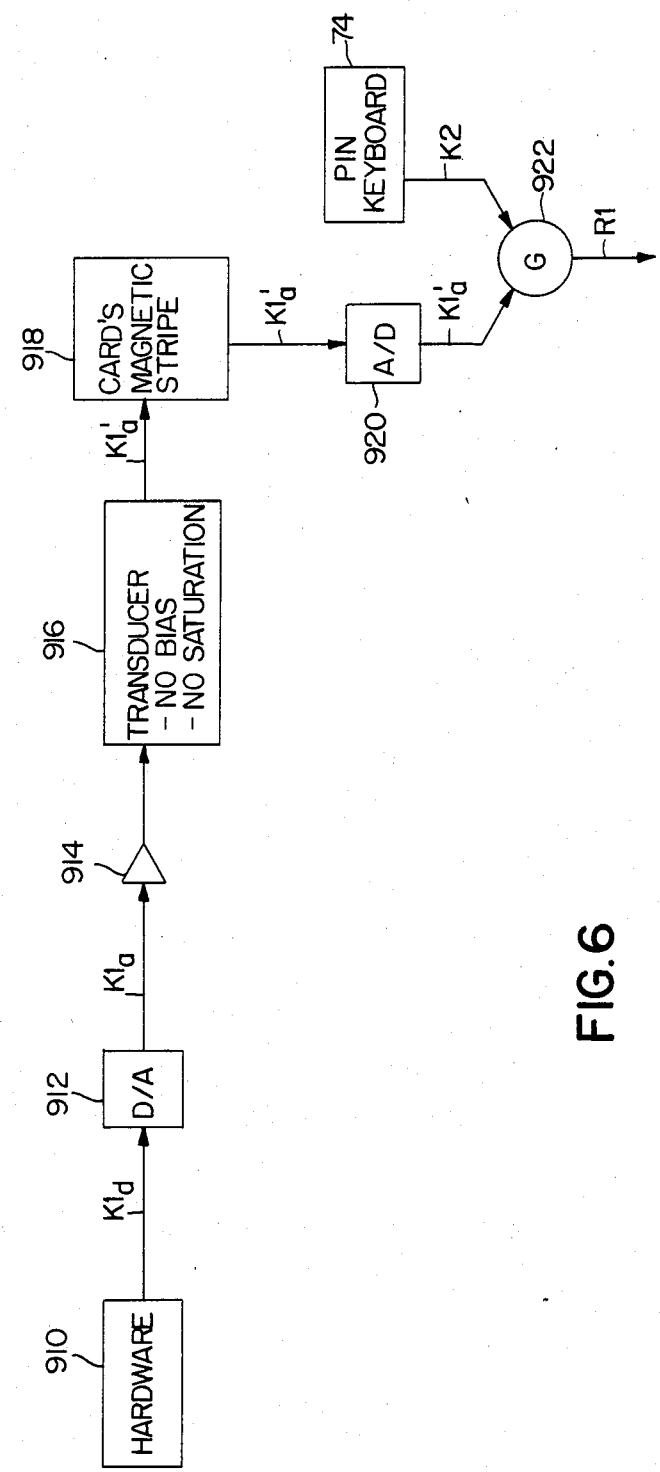
FIG. 6 is a block diagram illustrating the magnetic hysteresis method used in this invention.

FIGS. 4 and 6 further explain enciphering. After the ICCC has been inserted into the transaction register, hardware 910 randomly generates a 256-bit digital number K1d, which serves as the first enciphering key. This digital number is converted by a D/A converter 912 to an analog waveform K1a of that first enciphering key. This waveform is amplified by an amplifier 914, and coupled to a transducer 916, which produces a randomly mutated waveform K1a' that is recorded onto security track 102 of the ICCC's magnetic stripe 918 by transducer 916. The random mutation is created by recording the amplified original waveform K1a onto magnetic stripe 918 with no a.c. or d.c. bias and with care taken so as not to reach the saturation level of magnetic stripe 918.

Next, security track 102 of magnetic stripe 918 is read by transducer 916, and the randomly mutated waveform K1a' is sent to A/D converter 920, which produces an equivalent 256-bit digital number K1d'. This number is then combined with the PIN, which serves as a second enciphering key K2, by random sequence generator array 922 to produce a first pseudo-random string R1 which is used for enciphering transaction data to be recorded onto the data track 103 of magnetic stripe 918. There are many enciphering algorithms in existence. One possible enciphering algorithm, the Rivest Data Encryption Algorithm will be described later.

During the transaction, account information such as the account number, balance, and credit limits are written in enciphered form onto the data track 104. When the transaction is completed, the ICCC is ejected from the transaction register.

The first data written to the data track 104 during a transaction is a data track header, which is used to determine whether the next use of the ICCC is authorized. The header, say a BCD digit, is uniform throughout the ICCC system. It is enciphered using the pseudo-random string R1 key produced by the random hysteresis method described above, and then written onto the data track. The next time the ICCC is used the header is read and deciphered. Correct deciphering of the data track header is confirmation of an authorized use of the ICCC.

The next time the ICCC is used, the data information previously recorded onto the card must be deciphered. For deciphering, the procedure is as follows. When the ICCC is inserted, the randomly mutated waveform (K1a') is read from the data track 104 of magnetic stripe 918 and checked for the presence of any a.c. or d.c. bias. If any such bias is detected, thus indicating the probability of tampering with the ICCC, the card can be ejected or captured.

If no bias is detected, deciphering proceeds by passing the randomly mutated waveform (K1a') to A/D converter 920, which produces an equivalent 256-bit digital number (K1d'). This number is then combined with the PIN (K2) by random sequence generator array 922 to produce the first pseudo-random string R1, which is used by the deciphering algorithm. If the pseudo-random string produced during this deciphering stage is not identical to the one produced during enciphering (if, for example, an incorrect PIN had been entered), then the data track header will not decipher properly and the card would be ejected by the transaction register.

It is the random mutation of the waveform written to the security track 102 of magnetic stripe 918 that provides the advantageous security of the present invention, not previously found in off-line systems. Previously known off-line systems were susceptible to "buffering," whereby the information on a card's magnetic stripe could be recorded on a media outside of the card, to be re-recorded onto the card's magnetic stripe at a later time. An example of buffering is the following.

Suppose a card had a balance of $100 as indicated on its magnetic stripe, and this information was copied onto media outside of the card. The card could then be used to make purchases, with the balance successively lowered. But then the balance could be restored to $100 by re-recording the "buffered" information onto the card from the outside media. By contrast, in the present invention, because the randomly mutated signal is recorded onto the card with no bias, the presence of any bias will cause the card to be rejected or captured once such bias is detected. Since some kind of bias is required to record a specific signal on outside magnetic media, it is extraordinarily difficult to duplicate or buffer information on a card using the method of this invention.

The following is an example of the type of algorithm that can be used for enciphering data. If a plain text input of, say, 100 BCD digits is used, then the first pseudo-random string R1 would also contain 100 digits. Each digit of the plaintext input string is substituted with the four least significant bits of the sum of the BCD digit and its corresponding pseudo-random string R1 digit, thus producing a modified input string. The first pseudo-random string R1 is then processed by a non-recurrent limit function, which disposes of digits outside of a present range of, in this example, 1100, and is transformed into a second pseudo-random string R2. The order of the digits of the modified input string is then scrambled by using the sequence of the second pseudo-random string R2 as a key to the new position of each BCD digit. Thus the output is ciphertext of 100 BCD digits. The corresponding deciphering algorithm would proceed inversely.

DETAILED DESCRIPTION OF OPERATION

The system is constructed as a microprocessor unit (MPU)-based system using an interrupt architecture.

Figure 7:
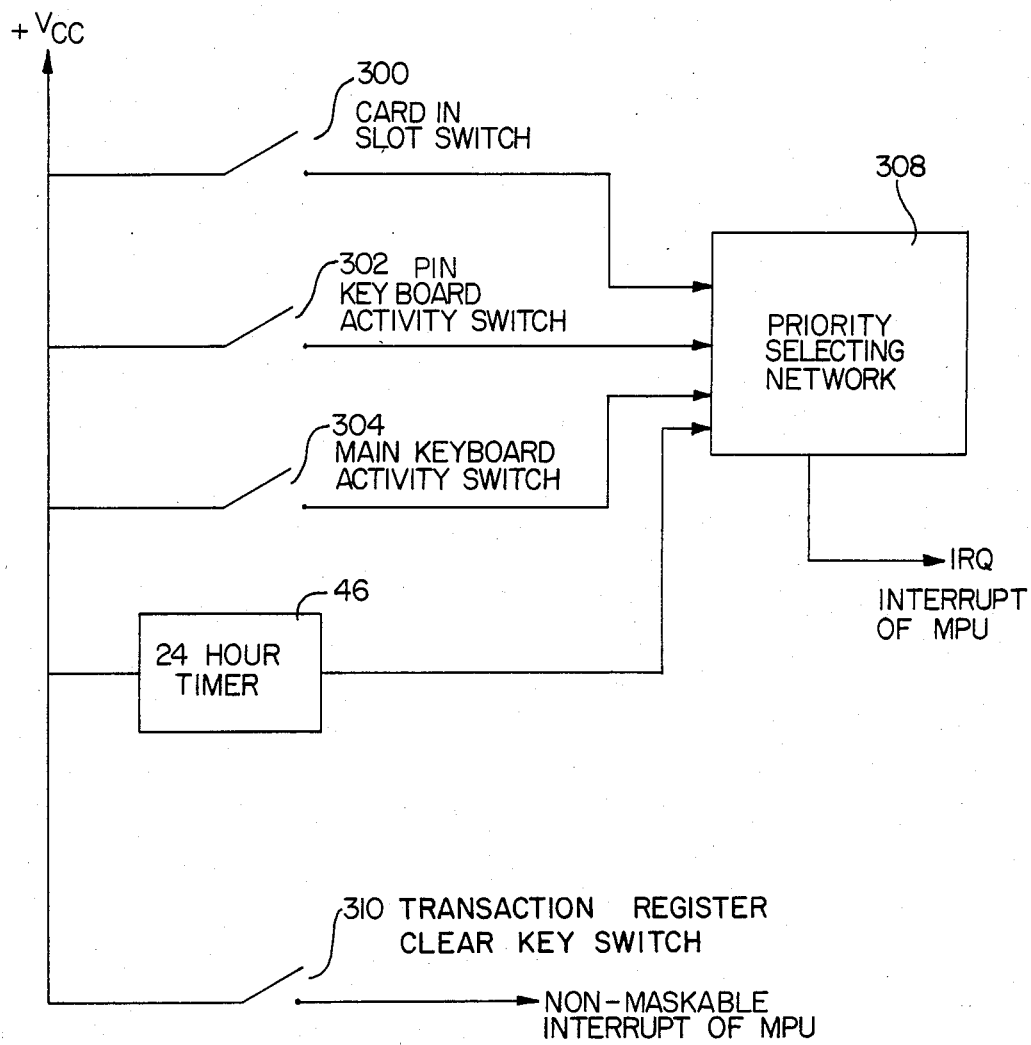
FIG. 7 is a block diagram illustrating the overall interrupt architecture of the cash card system.

FIG. 7 is a schematic diagram of the interrupt system of the present invention. A switch 300 is associated with slot 126 for detecting when a card has been inserted into the slot. A second switch 302 is associated with PIN keyboard 74 for indicating PIN keyboard activity. A third switch 304 associated with main keyboard 80 for indicating main keyboard activity. In addition, 24-hour timer 46 (also shown in FIG. 1) provides a logic level high at predetermined times for activating the clock interrupt routine shown in FIG. 15. The signals from switches 300, 302, 304 and timer 46 are coupled to a priority selecting network 308 formed as part of a PROM associated with the microprocessor. The priority selecting network selects which of a plurality of subroutines will be executed. This selection is coupled to the interrupt (IRQ) of the microprocessor. A separate switch (transaction register clear key switch) 310, associated with CLR key 112 on the transaction register, couples power to the non-maskable interrupt (NMI) of the microprocessor.

Figure 8:
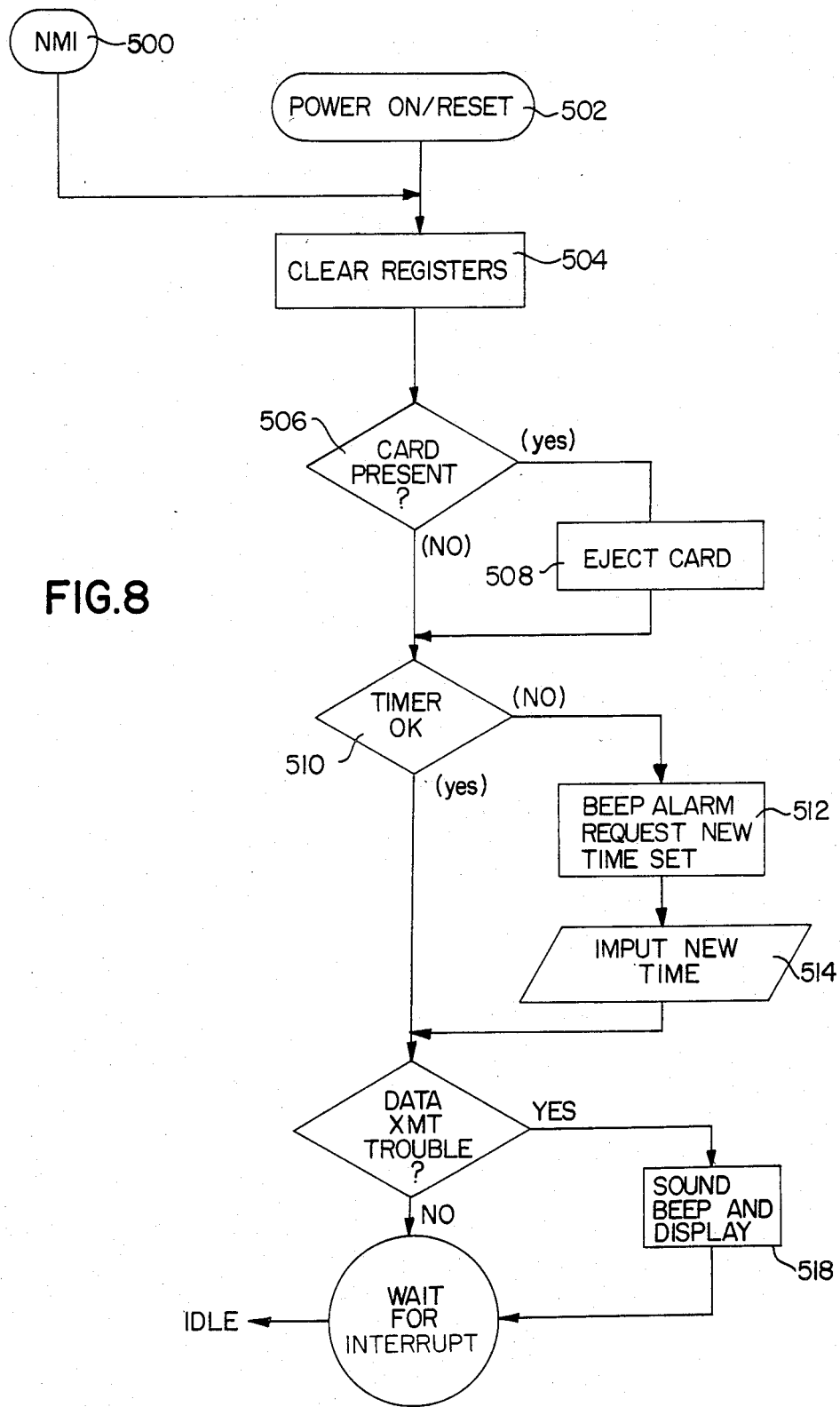
FIG. 8 shows a flow diagram of the initial power on routine executed at the beginning of each work day.

FIGS. 8-15 are flow diagrams illustrating in general the steps carried out by the system of the present invention in carrying out transactions. As shown in FIG. 8, when the power is turned on, the system waits for a key to be hit or a card to be inserted in a slot. Normally, when power is initially turned on at the beginning of a business day, the clear key is hit to clear all of the registers. If any card is present, it is ejected, and the timer is then checked.

Block 500 represents a non-maskable interrupt (NMI) triggered by transaction register clear key switch 310 shown in FIG. 7. In essence, the NMI acts to clear all functions. It is actuated by the clear key CLR 112 on keyboard 80. Block 502 refers to a power on/reset. The system provides a triggered reset signal to microprocessor 12 each time power is initially applied. After a reset, block 504 clears all memory registers including an A-register and B-register. At block 506 it is determined whether or not a card has been inserted into slot 126. If a card is present within the slot 126, the card is ejected, as noted by block 508. If no card is present in slot 126 or after a card has been ejected from the slot, it is determined whether 24-hour timer 46 is properly set. If there has been a power failure, then timer 46 resets. If timer 46 is not properly set, a beep alarm sounds as indicated by block 512, and an operator must reset the time, as indicated by block 514.

Figure 15:
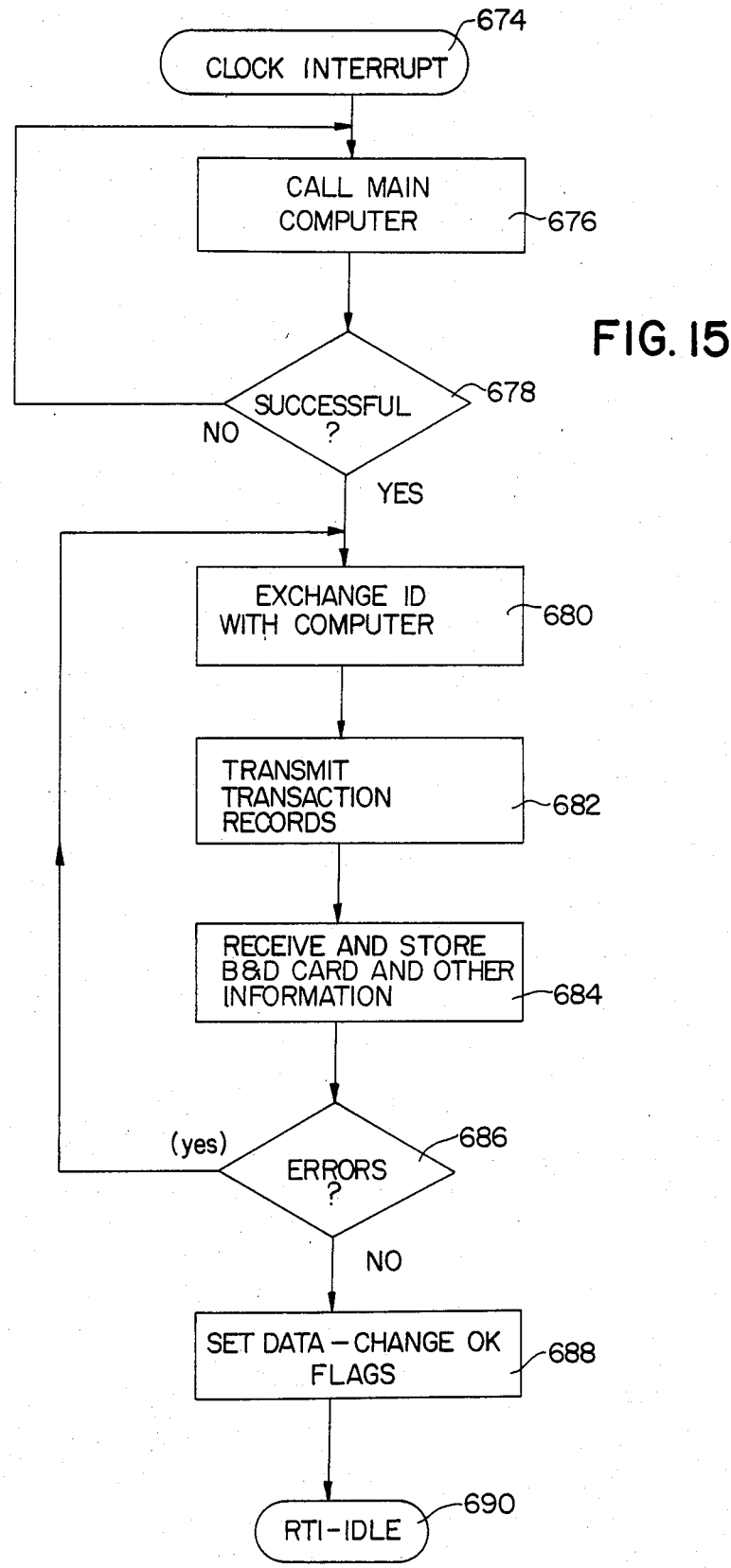
FIG. 15 shows a flow diagram of the clock interrupt routines.

As will be shown in greater detail in FIG. 15, the system contemplates automatic transmission of information at time intervals, for example during the night, to a central computer. Timer 46 is checked to make sure that it is functioning properly and thus that transmissions are taking place normally.

The system next determines whether there was any difficulty in transmitting data or if data had been properly transmitted during the previous night to the main computer. If there has been some difficulty, the operator will hear a beeping alarm and see a visual display indicating the nature of the trouble, as indicated by block 518. The display will call for a specific service along with the beep alarm. Once all these matters have been attended to, the system goes into an idle state and waits for an interrupt as indicated by block 520. As stated, the overall system architecture is constructed as an interrupt system. The processor interrupts or executes each action independent of other actions. The processor is not looking to see what is has to do. Rather, it waits for an operator to tell it what to do.

Figure 9:
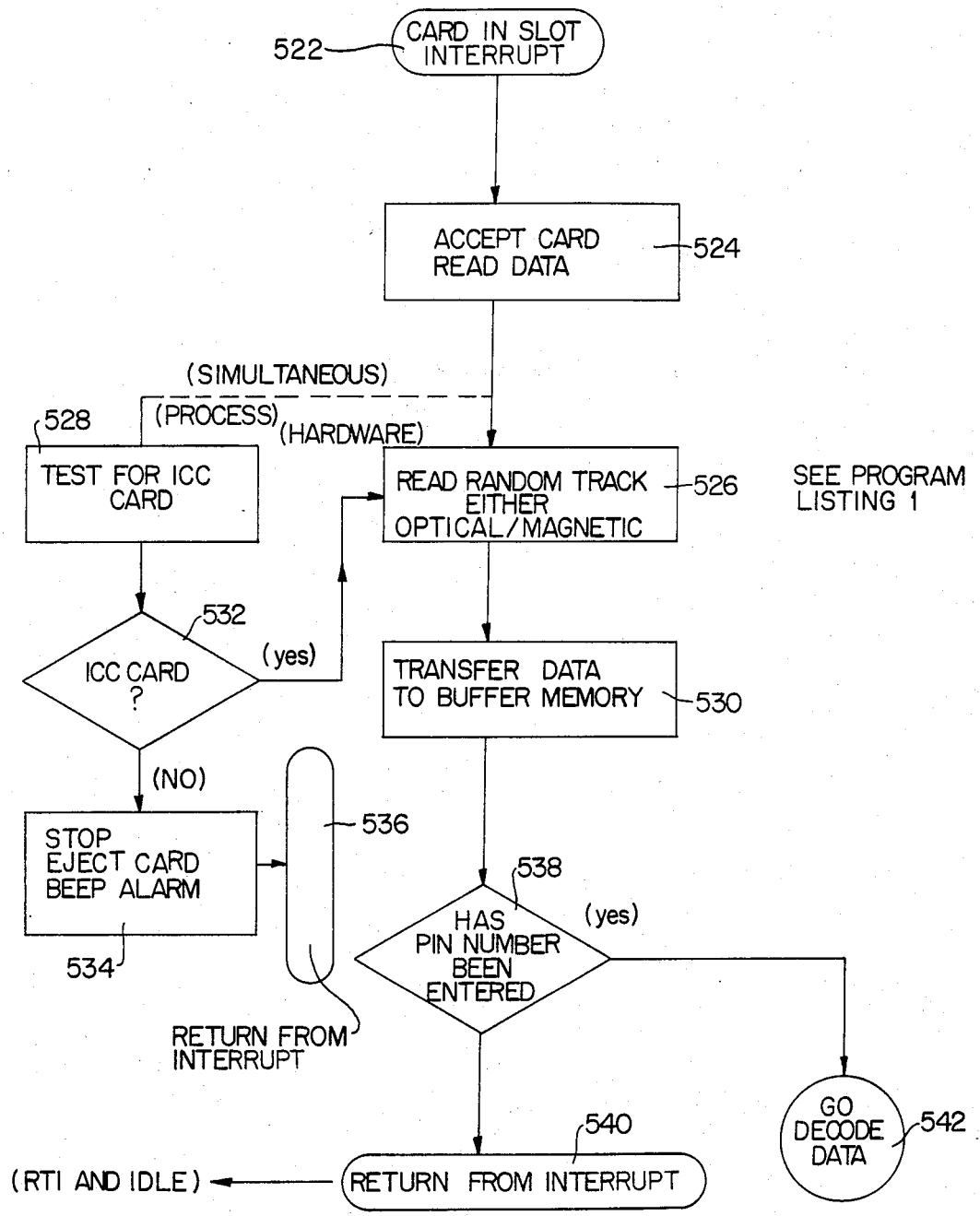
FIG. 9 shows the flow diagram of the card in slot interrupt routine.

If a card is inserted into a slot, the card in slot interrupt routine begins as shown in FIG. 9. After the card is accepted, three simultaneous tests are carried out. First, a check is made to make sure that the card is of a type that the system will accept, that is, it is not a card of some other system. Second, the security track and data track of the magnetic strip 18 are read. Once the PIN has been entered, the data track header is deciphered. Third, parity checking occurs as the security and data tracks are read.

FIG. 9 is a flow chart of the card in slot interrupt. When a card is inserted into slot 26, switch 300 generates a card in slot interrupt as shown by block 522. This interrupt eventually provides a signal on the IRQ interrupt of the microprocessor. When the card has been inserted into slot 126, a motor is activated that pulls the card in. The security track is then read as shown in block 524, and then the data track is read and the data transferred to buffer memory as shown in blocks 526 and 530. (As the security and data tracks are being read, there is a reading and testing for parity. In the event of an error, there is a re-test for the presence of an appropriate ICCC card at block 532.) The security subroutine used in block 526 and in blocks 600 and 622 is set forth in Appendix A.

At the same time, as shown in block 528, there is a test to verify whether the card inserted is a proper ICCC card. Should an inappropriate card be inserted into slot 126, the card will be immediately rejected. In the event that block 532 determined an invalid ICCC card, block 534 stops all functions. An audible alarm sounds and control is returned from the interrupt as shown in block 536. This places the system into an idle state.

When a valid cash card has been detected, then, as shown in block 526, the security track and data track are read from the card. At block 530, the data read from a card is transferred to a buffer memory. An error detection loop, not shown, repeats the "read" until it is successful. In block 538 it is determined whether a PIN has been entered. If so, then the data track header read from the card is decoded as shown in block 542. However, in the event no PIN number has been entered, system control returns from the interrupt into an idle mode. When that number is entered, the system goes through the routine shown in FIG. 10.

After the PIN is entered, the system checks to see whether the card has been read, that is, the system has gone through the steps of FIG. 9. If that has taken place, then the system decodes the data track header, at 542, to see whether the entered PIN is correct. If not, a beep alarm is sounded. The system further counts the number of successive errors and the transaction is stopped in the event that the number of errors indicates that an attempt is being made to make a match by entry of successive digits without knowledge of the real PIN.

Figure 10:
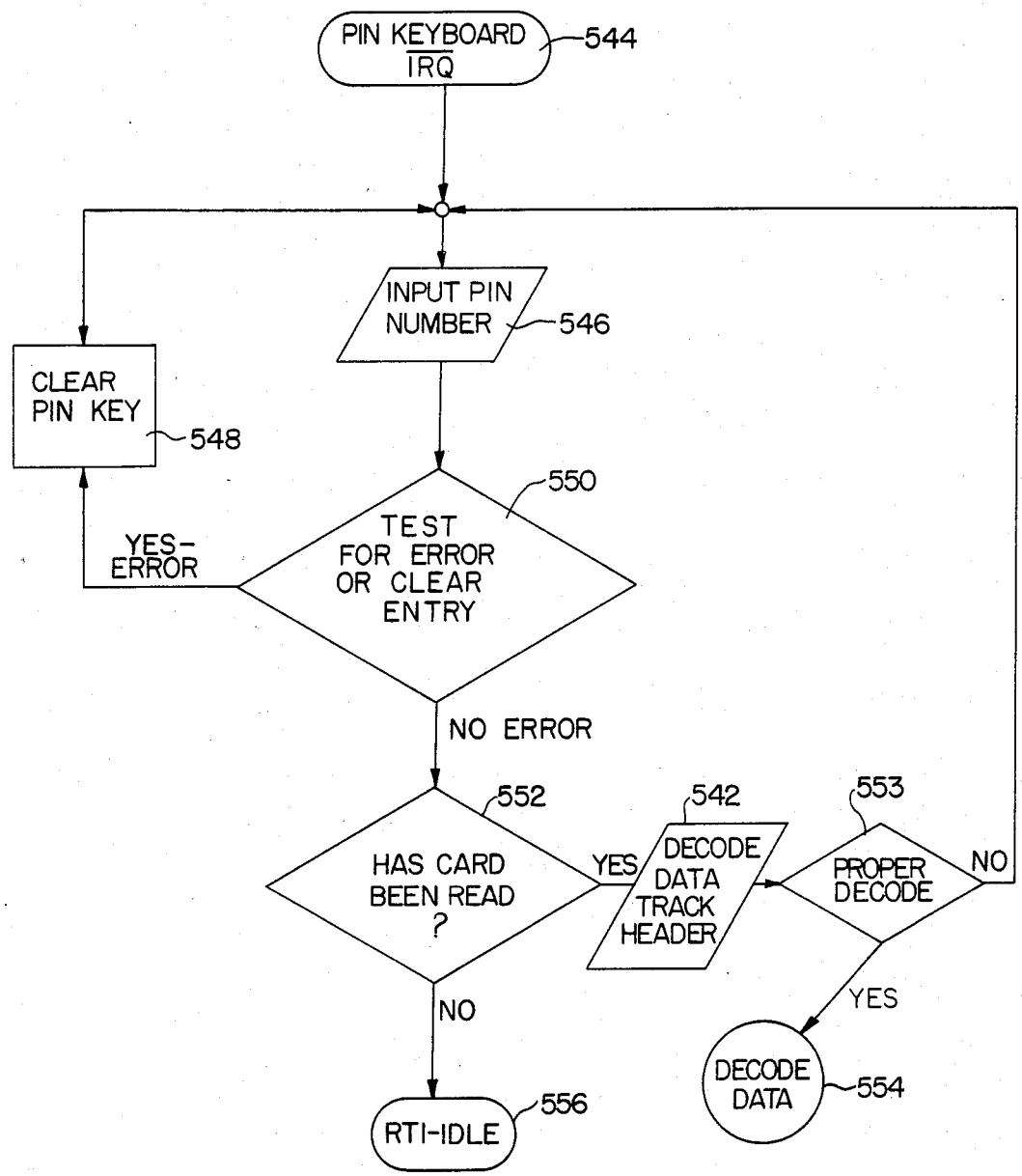
FIG. 10 shows a flow diagram of the PIN key interrupt routine.

FIG. 10 is a flow chart of the PIN keyboard interrupt routine. The PIN keyboard interrupt triggered by switch 302 (shown in FIG. 7) is shown at block 544. This interrupt is triggered whenever any of the buttons on the PIN keyboard is pressed. The Motorola 6800 Microprocessor, selected in the preferred embodiment, has an inverted IRQ. Therefore, it is shown as such in the drawings. As the customer begins to enter a PIN via PIN keyboard 74, this system, as shown in block 546, begins to respond and accepts the data being input by the customer. As data is being entered, block 550 tests for various errors or clears an entry. The PIN keyboard 74 has a clearing key that is used to wipe out previously entered numbers. If there has been an error or if the clear button has been pressed, control goes to block 548. Block 548 prevents anyone from entering the PIN over and over again. It will stop system interaction with the customer after two minutes lapse in order to discourage repetitive inserts of erroneous PIN's. At block 552, the system determines whether a card has been read. If not, control returns via block 56 to an idle condition. If so, the data track header is decoded at block 542. Block 543 determines whether the decode was successful. If the decode succeeded, control goes to a decode data block 554. If the decode failed, control goes back to block 546 to allow another PIN to be input.

Figure 11:
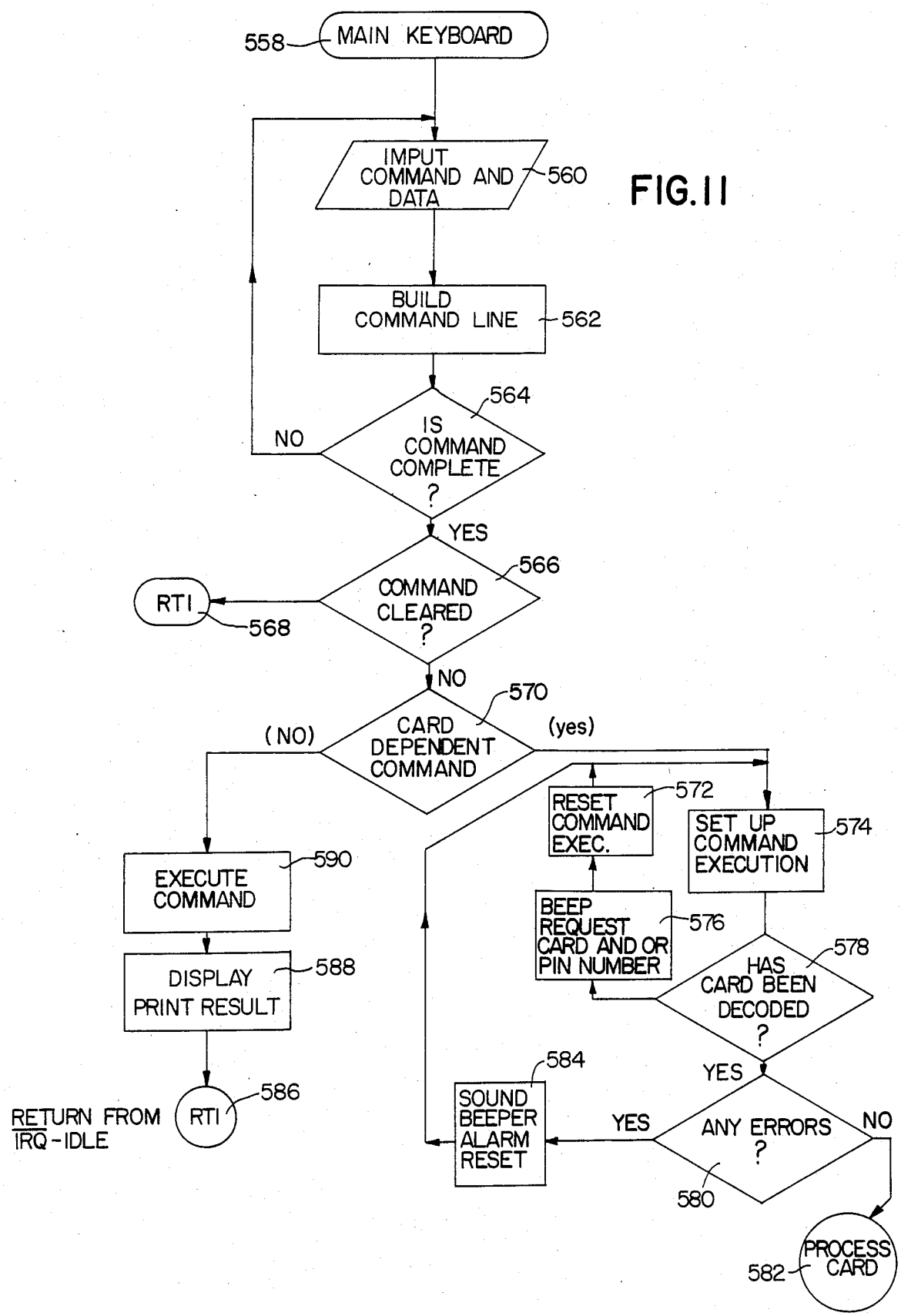
FIG. 11 shows a flow diagram of the main keyboard interrupt routine.

When one of the main keyboard keys is operated, as shown in FIG. 11, the system first checks to see whether the transaction is a card dependent transaction or not. The main keyboard can be used for arithmetic and other calculations like a calculator. If the transaction is not card dependent, then the command is executed and the result is displayed and printed. If the command is card dependent, then a check is made to see if the card has been coded correctly, and whether the PIN number has been matched. If both of these checks are positive then the desired command is executed.

Referring now to the specific blocks of FIG. 11, the main keyboard 80 interrupt triggered by switch 304 (shown in FIG. 7) is shown at block 558. This interrupt occurs when the operator presses any of the main keyboard buttons. At block 60, data entered via the main keyboard is accepted. From the data entered via keyboard 80, a command line is built at block 562. This function is similar to that of an adding machine executing, for example, the equation $2+2=4$. In essence, it totals a sale or other transaction like a conventional cash register. The command built in block 562 is checked for completeness at block 564. If the command is complete, the user activates the appropriate button and controls flow to block 566. If the command is not complete, the control returns to block 560 and further input is accepted. At block 566, the system determines whether the command, determined complete at block 564, has been cleared. If it has been cleared, control goes to block 568 where the system returns from the interrupt to an idle state.

At block 570, the system determines whether the command constructed at block 562 and confirmed via blocks 564 and 566 is going to affect the card or not affect the card. Some commands, for example a balance inquiry, would not affect the card. As another example, a user might be merely using the transaction register as a calculator for adding or subtracting; such use also would not affect the card. In such cases, command would go to block 590 and then to block 588 where the computer results would be displayed. Control would then return from interrupt at 586 to an idle condition. However, if the command was card dependent, control would flow to block 574, which interrupts the command and decides what is required to get the command executed. Block 578 determines whether the card information has been decoded. If the card information has been decoded, control flows to block 576 which causes the system to request data. The command would go back to an idle state via blocks 572 and 574. If at block 578 the card data had been decoded, an error test would take place at block 580. An error would cause an audible alarm to sound and a reset function, shown in block 584. If no error were determined at block 580, then the card data would be processed at block 582.

Figure 12:
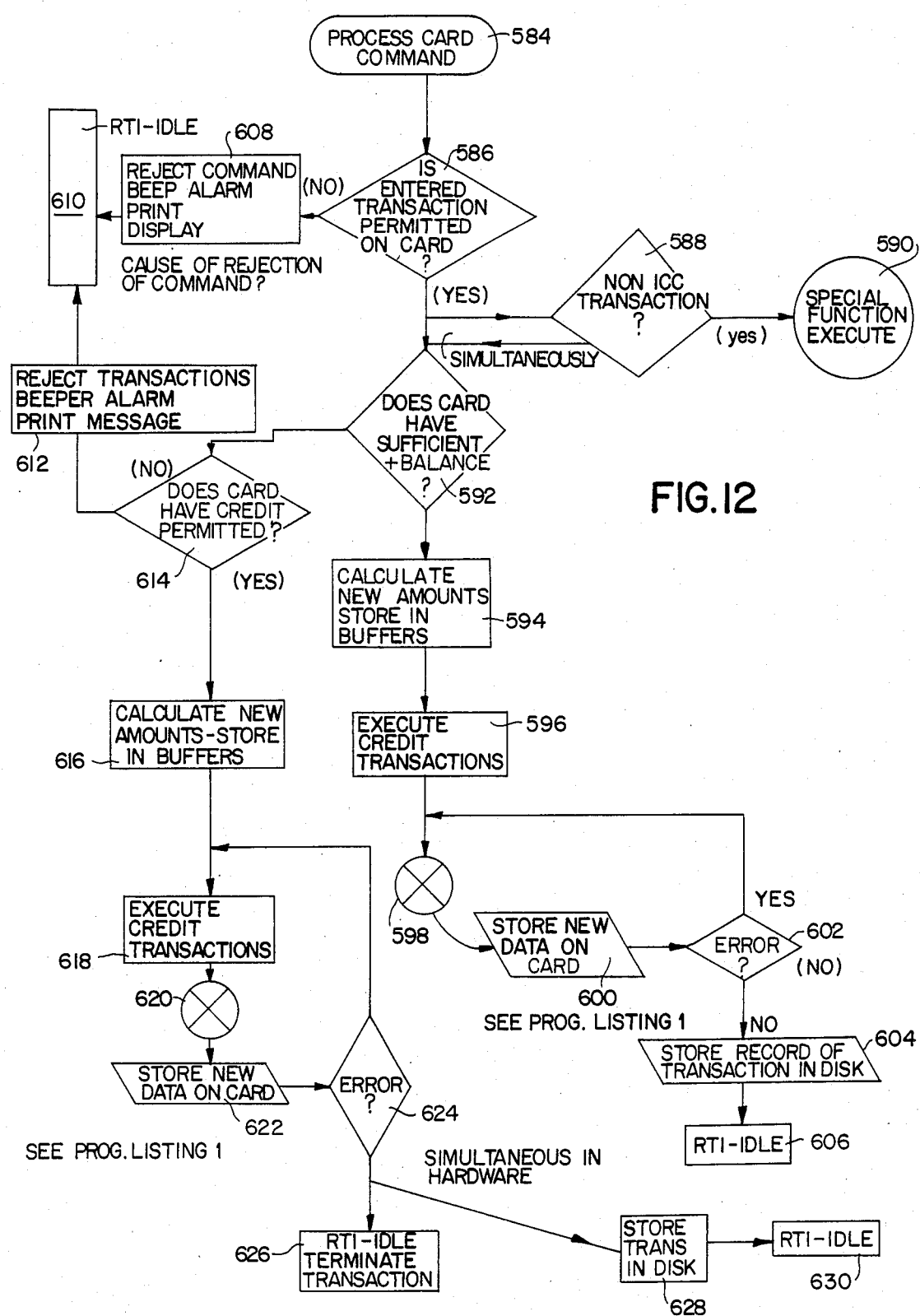
FIG. 12 shows a flow diagram of the process card command routine.

FIG. 12 illustrates the flow diagram for a command entered into the transaction side of the keyboard. First, the system checks to see whether the transaction is a permitted one, under either the ICCC system or another. While only the ICCC card will fit into the TR, and in fact the TR will reject any foreign card entered, coding for other card systems may be placed on the ICCC card and this coding can be recognized by the TR. If the transaction is not a permitted one, then a check is made to see whether the presented card is an allowed card of another system. If the transaction is permitted then the balance or credit of the card is checked to see whether the transaction is allowed. If the transaction is proper, then new amounts are calculated, stored and re-encoded on the card. The transaction is then stored on the magnetic disk for eventual transmission to the central computer.

Block 584 begins the routine for processing card commands. Block 586 determines whether the transaction selected is permitted for the card inserted into slot 126. By reading the card, the system determines whether that transaction is permitted or not. For example, an attempted purchase using a card with a negative balance and no credit authorization would not be a permitted transaction. In the event that a transaction is not permitted, block 608 causes an appropriate display to be printed and an audible alarm to sound. The card is then rejected and control returns to an idle mode via block 610.

Assuming the transaction is permitted for the particular card inserted into slot 126, control flows from block 586 to block 592. There, it is determined whether the card has a sufficient balance for the transaction. In essence, the system looks at the purchase desired (as entered via Main Keyboard 80), examines the data on the card and determines whether a sufficient balance exists. If a sufficient balance exists, control flows to block 594 where a new card amount is calculated, stored and buffered. Then, control flows to block 596 so that the current transaction can be executed. The block 598 represents an enciphering algorithm which is maintained secret for security reasons. Block 598 represents any enciphering algorithm collected, as shown in the art. Once the data has been enciphered, the new data is stored on the card at block 600. In the event no error is determined at block 600, a record of the transaction is stored in disk storage (in circuit 60) at block 609 and return to an idle condition occurs via block 606.

Simultaneous to determining at block 586 that the transaction is permitted, block 588 checks to determine whether the transaction is permitted for that card. It also checks the command that has been constructed. If a non-ICCC transaction has been determined, the data must be handled by a special function program indicated by block 590. For example, if users of a particular credit card have been incorporated into the ICCC system, such as Visa, Master Card, etc., the particular data from those cards would be read and handled via a special sub-routine.

In the event the card does not have a sufficient balance for the transaction, control flows to block 614, which determines whether there is appropriate credit to handle the transaction. If there is insufficient credit, the transaction is rejected at block 612 and the system returns to an idle condition at block 610. However, in the event that at block 614 it is determined that there is adequate credit, block 616 calculates the appropriate amounts and stores them in buffer memory. Control then flows to block 618 where the credit transaction is executed. Block 620 represents an enciphering algorithm which is, of course, maintained secret for card security. This block represents any such algorithm known in the art. The enciphered new data is then stored on the card at block 622. An error check occurs at block 624. In the event of no error, the transaction is stored on disk at block 628 and the system returns to idle at block 630.

Figure 13:
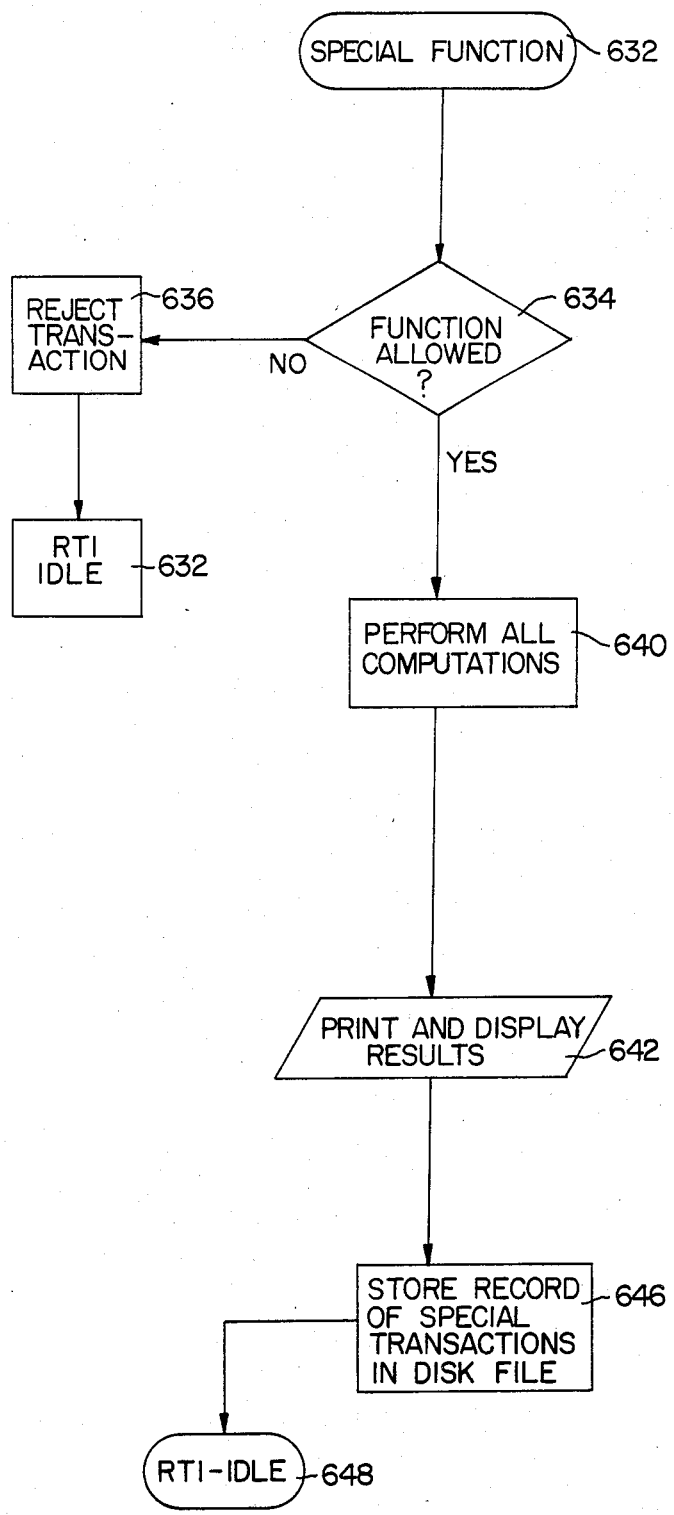
FIG. 13 is a flow diagram of the special function interrupt routine.

FIG. 13 is a flow chart of a special function interrupt. Special function block 632 represents the continuation of block 590 shown in FIG. 12. Special functions do not modify data on the major credit card but is re-encoded. This system determines, at block 634, whether the function requested is allowed, i.e. whether the card is coded to permit the request by a customer of a non-ICCC transaction. For example, has the card inserted been allowed for a particular major credit card or not. Possible functions include billing a transaction to a major credit card, paying a major credit card bill with ICCC funds, etc. If the function is not allowed, control goes to block 636 which rejects the transaction and then the system goes to idle via block 638. However, if the function is allowed at block 634, control goes to block 640 where all computations are performed. For example, the computation for a transaction involving a major credit card encoded on ICCC would take place. In addition, computations could be performed for the payment of major credit card bills with ICCC funds, etc. From computation block 640, the results of the computation would be printed and displayed at block 642. At block 646, the record would be stored in a disk file and the system would return to an idle condition via block 648. After the information is stored, it would be among the data automatically transferred to the ICCC host computer via modem 56, and the information would ultimately be relayed to the designated major credit card company.

Figure 14:
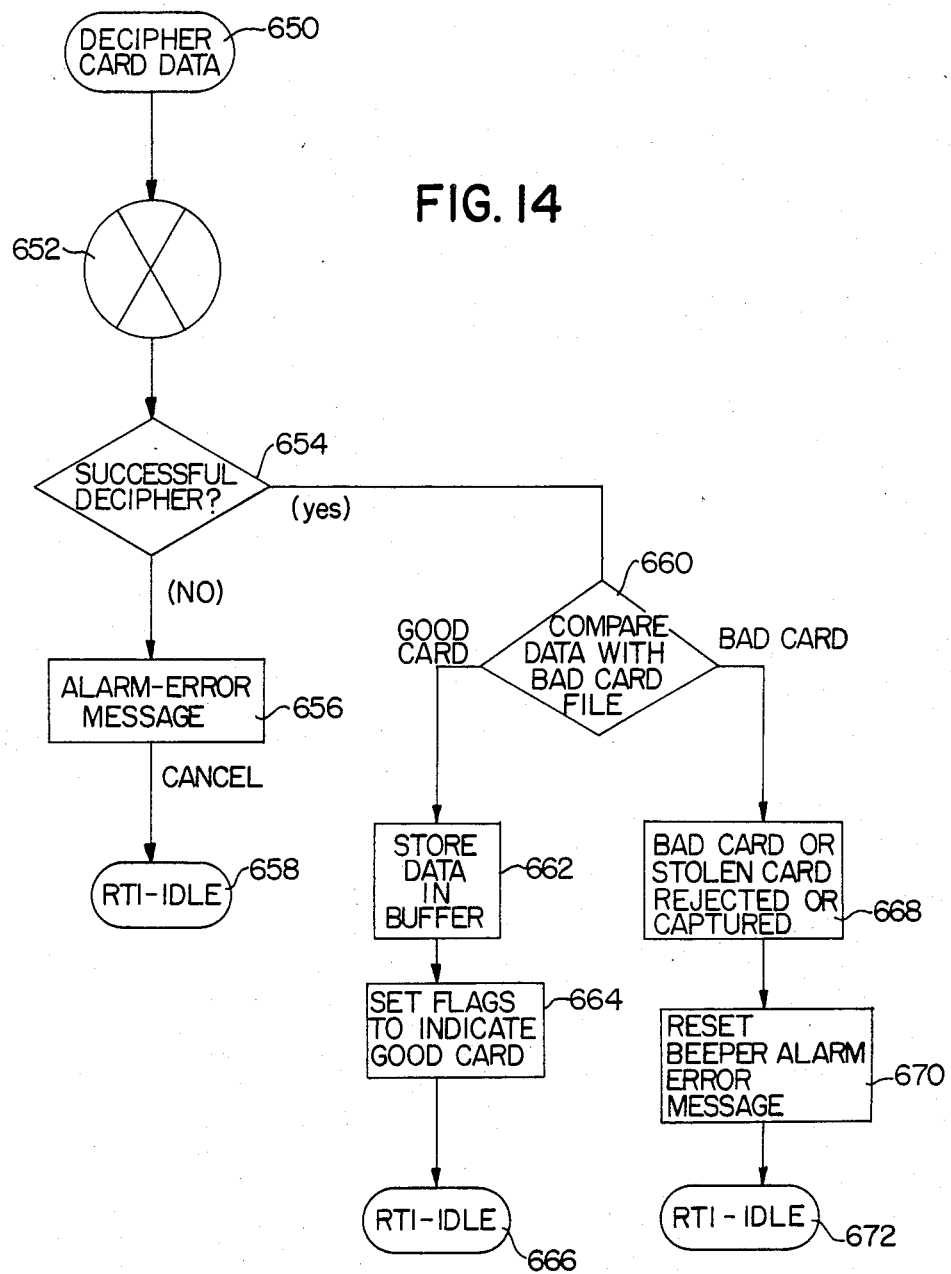
FIG. 14 is a flow diagram of decode card data routine.

FIG. 14 is a flow chart of the routine for decoding card data. Block 650 represents the initial step for deciphering card data. Block 650 is in essence the continuation of block 542 shown in FIG. 9. This Figure illustrates the routine use to decipher data on a card. Data from the card is deciphered at block 652. This block represents a deciphering algorithm by which data from the card's security track and the entered PIN are used as keys to decipher data which was previously stored on the card. Of course, this algorithm would be maintained secret by the user. Block 652 represents any such deciphering algorithm ultimately selected by the user and is therefore not shown in detail. Control would never have reached block 650 unless a card where inserted into slot 126 and a PIN number keyed in via PIN keyboard 74. By the time control reaches block 652, it is therefore assumed that data has been read and that there have been no errors in either entry of the PIN or on the card at itself.

At block 654 it is determined whether the card has been successfully deciphered. If the decipher has been successful, control goes to block 660 where card data is compared with data maintained in a bad card file in the transaction register memory. If this comparison indicates that the card has not been invalidated for any reason, control goes to block 662 which stores the data in a buffer. Then, control goes to block 664 which sets flags indicating that the card is good. Then, control flows to block 666 and the system returns to the idle condition.

However, if comparison at block 660 indicates that the card is bad, control flows to block 668 which causes the card to be captured or rejected. Control then flows to block 670 which resets the transaction and sets off an audible alarm and causes an error message to be displayed or printed. The system then returns to an idle state via block 672.

Using the deciphering routine shown in this Figure, the only thing that would cause a card to not successfully decipher is if it had been tampered with, if a PIN entered was not correct or if the card were defective, erased, or severely damaged. If it should be merely weather-beaten, the card would be rejected and not captured.

FIG. 15 illustrates the clock interrupt routine. As discussed briefly above, periodically information is transmitted to the main computer in the member bank under the control of timer 46. When the timer indicates that transmission should occur, the computer is contacted and stored records are transferred. The system then receives from the main computer and stores an up-dated list of valid cards.

This routine handles the transmission of data to the member bank's main computer from a transaction register. Block 674 represents the interrupt from clock 46. Clock 46 provides the ability to set the transmission time to a normally down-time such as two o'clock in the morning for transmission to the bank. Each transaction register will transmit at a different time to the bank. That transmission is actuated by the timer interrupt, via timer 306 and priority selecting network 308 shown in FIG. 7. At block 676, the main computer is called via a telephone dial-up link.

Block 678 determines whether the transaction register has successfully called the computer. If not, the transaction register redials via the telephone link until it is connected with the main computer. If it does connect, control flows to block 680 which causes an identification exchange between the transaction register and the computer. After ID information has been exchanged with the bank computer through a string of codes, control flows to block 682 whereat the transaction register transmits a copy of all transactions that have taken place and are on file. At block 684, the transaction register receives from the bank computer data concerning invalid cards and other information and stores this data for later use in dealing with customer transactions. At block 686 it is determined whether any errors were noted. These would include parity errors, static on line, etc. If errors were noted, control returns to block 680 and the information exchanges are repeated. However, if no error is determined at block 686 it is assumed that data has been successfully exchanged and appropriate flags are set. The system then returns to an idle state via block 690.

Fraud

There are two main possible sources of fraud which the system must guard against. The first involves fraud by the bearer of the card, and the second involves fraud by the retail outlets subscribing to the system. If a card is lost, the PIN, known only to the owner of the card, insures that unauthorized persons cannot use the card and eliminates signature and identification requirements. Without the correct PIN the card is useless, and nothing in the cash card system can be compromised so as to divulge it. The PIN is neither contained on the card's magnetic strip nor stored in any of the system's computers; it is known only by the card holder. As described previously, the PIN is able to identify the card holder because it is used as an enciphering key, and thus must be entered correctly upon each use of the card in order to correctly decipher the data recorded on the card during its previous use. The enciphering of the information on the card also prevents the alteration of the contents of the card. However, should an identified card be counterfeited and used, this type of fraud may not be detected by the transaction register but would eventually show up as an incorrect balance at the lead bank or ICCC computer processing center. The identity of the card holder would then be determined and he could be traced through the account at his bank. Every card holder must have an account at the lead bank, and proper identification must be provided when the account is opened along with completing an application.

Fraud by the retail outlet could be perpetrated by tampering with the disk to reflect transactions which have not taken place. This type of fraud is prevented by the use of a scrambled encoding similar to that used in the cards. The cashier could not enter extra sales to a customer's card since the PIN must be entered before every transaction. The electronic chip of the transaction register is encapsulated to prevent anyone from determining or decoding the algorithm by studying the program stored in memory. Any attempt to access the microprocessor bus will cause the power to the battery-backed RAM units 22, 24, 26, 28, and 30 to be cut off, thus erasing all sensitive software.

As briefly discussed above, the cash card system includes many highly advantageous security measures. The strongest of these security measures is the card itself. The "hash" encoding of information contained on the magnetic stripe cannot be duplicated, skimmed (transferring magnetically encoded data directly from a genuine card to any number of striped cards) or buffered (buffering creates exhausted data: information encoded on a genuine card is transferred to a storage medium and then transferred back at a later date) without using a.c. or d.c. bias, which would be detected by a transaction register.

The enciphering and deciphering algorithms are contained within a chip located in each transaction register and cannot be removed without first being destroyed. The probability of deciphering the data on the card without the algorithm is very small. Furthermore, the enciphering and deciphering algorithms can be changed periodically to further insure the security of the system. The enciphering algorithm is represented by blocks 598 and 620 in FIG. 12 and the deciphering algorithm is represented by block 652 in FIG. 14.

Should a card be accidentally erased or otherwise damaged or worn to the extent that it cannot be read electronically, a member bank can replace it with a new card through the use of the bank's transaction register and by drawing on the records of the central computer for all transactions that have been previously placed on the card.

The security control for the cash card system is the central cash card computer which gathers security information from all sources within the system and transfers that data to the disk memory of each transaction register. This security information helps to determine which cash card will be accepted, rejected or captured. Cards are rejected if they appear in the security file, if they are damaged or worn so as to be unreadable, or if they are used with an incorrect PIN.

Should a customer lose his cash card, the finder cannot use it unless he also knows the customer's PIN. Lost or stolen cash cards can be reported to the central cash card computer through either the member bank, a retail outlet, or the cash card system provided. Cash cards that have been reported as lost or stolen will be rejected by any transaction register or modular register even if the correct PIN is used.

Transaction registers that have been stolen cannot be operated unless a particular code number is known and activated. This code number must be activated before the transaction register can be used. Therefore, stolen transaction registers cannot be used by a thief to update his ICC card cash balance. Should the code of a transaction register become known and used by unauthorized persons, the cash cards used in that transaction register after the date it was stolen will be reported to the disks of all other transaction registers via the system's computers. These cards will then be captured when used. Their capture provides evidence that can be used in later prosecuting the thief of the transaction register.

The credit key, used to activate the deposits to the cash card, also requires a code number for use. The manager of a retail outlet can be made responsible for all credits placed on the cash card by his outlet transaction register. If the manager (or anyone else) does raise his cash card without an offsetting debit, the computer will detect the balances of the cash cards that have been fraudulently credited do not correspond to their respective account balances. These cards will be captured when any further attempt is made to use them within the cash card system.

Credit limits that are assigned to each transaction register can be reduced or raised by the central computer. Those transaction registers having a track record of unorthodox deposits will have their credit limits reduced or eliminated by the provider of cash card services.

The cash card system also provides a special service to retail outlets by protecting them from bad checks. Should a check deposited through the ICCC system be returned due to insufficient funds, the retail outlet can contact the ICCC central computer. The computer places the customer's cash card ID in its security file. This information is transmitted to the memory disk of every transaction register and modular transaction register. Until the customer reconciles the bad check, the customer's subsequent cash card transactions are all rejected.

Uses of the System

The uses of the cash card system of this invention are virtually unlimited due to the system's adaptability; several modifications may be made without departing from the spirit of this invention. For example, the transaction register shown in FIG. 1 can be constructed as a modular transaction register suitable for use with gasoline pumps, vending machines, pay telephones, ticket dispensers, taxicabs, etc. The modular transaction register is a transaction register that can be customized for special applications. The heart of the modular transaction register is a box containing all of the electronic components of the transaction register shown in FIG. 1 including the telephone modem. In the modular transaction register the box has been separated from its plug-in accompaniments such as the card reader-writer, PIN keyboard, main keyboard printer and display. These accompaniments can either be plugged in directly, connected at some remote point or eliminated all together.

The characteristic common to all variety of modular transaction registers is that the ICCC customer, instead of making a transaction with a cashier, makes the transactions with the machine without using funds that are usually necessary for the type of transactions which occur in motion picture houses, taxi cabs, gasoline stations, etc.

For example the main keyboard connectors of the modular transaction register may be connected to the total sale display of a gasoline pump. The cash card would be automatically debited for the cost of the gasoline. In such a case the cash card could also be used to turn the gasoline pump on and off. This raises the possibility of gasoline pumps appearing in every corner, of, say, 100 pumps all under the supervision of a single attendant, thus cutting costs to the oil companies.

Further, a taxi driver using a modular transaction register would turn in his memory disk to the taxi office at the end of the shift, and the taxi office in turn would transmit the contents of the disk to the ICCC computer through their transaction register. In addition, any kind of vending machine could be equipped with the modular transaction register. For example, airline tickets could be sold through vending machines or pay telephones could accept card transactions, which would be especially helpful at airports where travelers often make long distance calls. There are many other uses, such as theaters, busses, etc., which would reduce the threat of robbery. The carrier simply turns in disk to the dispatch office after each shift which transfer totals, electronically, to its member bank.

Further, using a "transaction terminal" designed to operate only when connected to a transaction register through a telephone line, it would be possible for card holders to purchase goods or services from their homes or offices.

Figure 5:
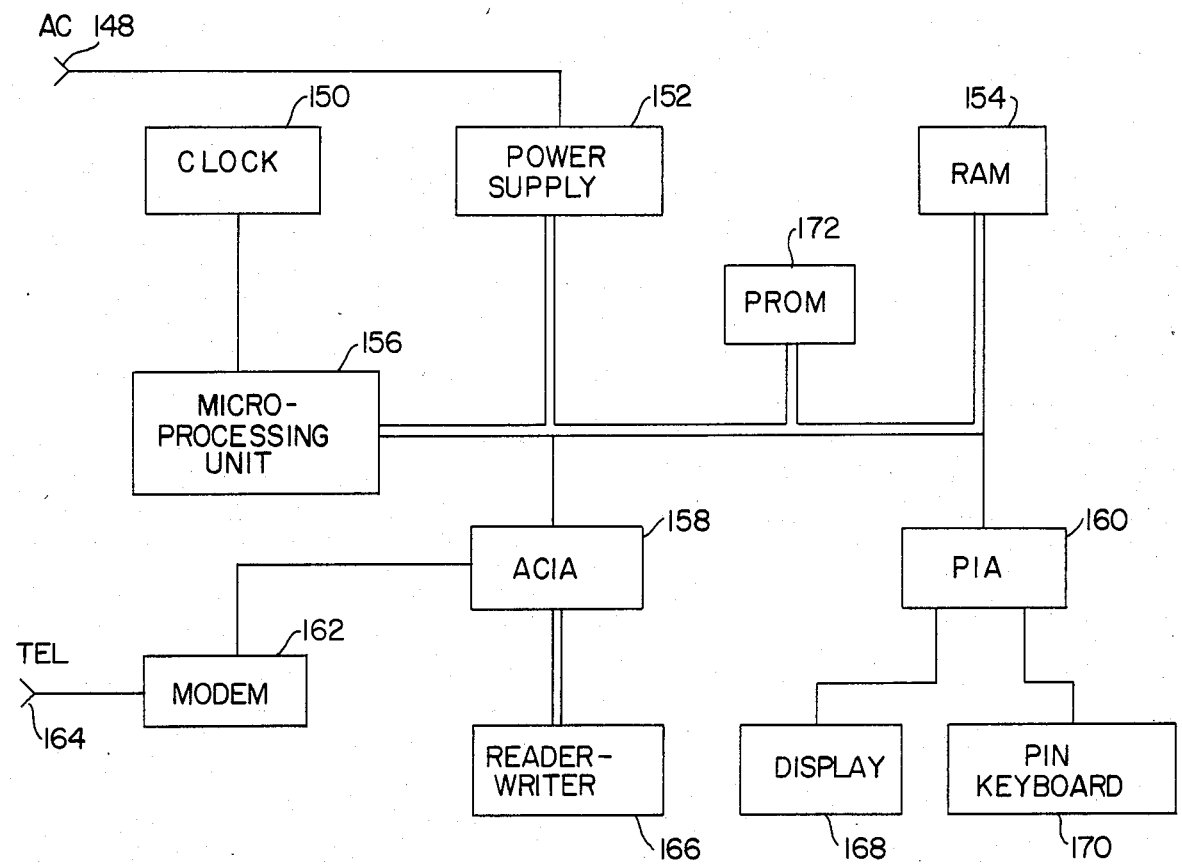
FIG. 5 is a block diagram of the cash card system of the present invention illustrating a card terminal unit only.

In FIG. 5, there is shown a transaction terminal that is remote from the transaction register to which it is connected via the card holder's home telephone. It is not designed to take cash, does not have a credit or debit key and does not have a memory disk. It must be used in conjunction with a telephone line and a transaction register.

An a.c. voltage from an outlet 148 of a line current is supplied to the power supply 152, where it is converted into the voltage required for the operation of the cash card terminal of the system. A clock 150 is provided in the system for generating pulses which activate the microprocessor unit 156, for processing all data fed into the system. A Random Access Memory (RAM) 154 is employed in the system for temporarily storing the Personal Identification Number (PIN), totals, amounts, etc., of each transaction to be later transferred to a disk for permanent recording at a data processing center, as explained previously above.

An Asynchronous Communications Interface Adapter (ACIA) 158 is the module which the microprocessor unit 156 uses to serialize and shift data in and out of the card terminal to a disk of a transaction register (not shown), via the Modem 162 connected to a telephone line outlet 164. A card Reader-Writer 166 reads and records information on the card according to instructions received from the microprocessor unit 156. A Peripheral Interface Adapter (PIA) 160 allows the microprocessor unit 156 to control functions outside the microprocessor, i.e., the Display 168 and the PIN Keyboard 170. A Programmable Read Only Memory (PROM) Module 172 is the memory unit which contains the program that is used by the microprocessor 156 to drive the system. The operation of the PIN keyboard 170 is identical to that of the PIN keyboard 74, as shown in FIG. 1, and previously explained above.

Debit and Credit Processing

FIGS. 16–22 represent how the cash card system processes its debits and credits. The following is a summary index of various reference characters used in these figures.

I. ICCC Card Transactions
(1) Lowers ICCC cash (credit) balance by amount of purchase or cash withdrawn.
(2) Credits ro on day of deposit receiving immediate credit.
(3) Raises ICCC cash (credit) balance by amount of credit.
(4) Debits ro on day of deposit.

II. ICCC CREDIT CARD TRANSACTIONS
(5) lowers ICCC cash (credit) balance until it reaches zero; then increases debit balance until ceiling charge limit is reached. Accounts with debit balances are billed out monthly by lead band.
(6) Credit ro on day of deposit receiving immediate credit.
(7) Decreases debit balance until it reaches zero; then raises ICCC cash (credit) balance.
(8) Debits ro on day of deposit.

III. MAJOR CREDIT CARD (MCC-ICCC) AND OTHER CREDIT CARD TRANSACTIONS
(9) code#indicates which credit card transaction is to be recorded on. Does not effect ICCC balance.
(10) Credit to joint account is reduced by percent charged by MCC.
(11) Reduced ICCC cash balance by amount of payment.

FIG. 16 is an overview of the entire cash card system (ICCC). A lead bank establishes the following accounts:
1. A joint account between lead and member bank (MB-LB-ICCC).

2. A customer account (presumably an interest bearing account) for each individual belonging to the ICCC system (CUST-ICCC).

3. A provider system account which receives a fee per transaction related to the amount of the transaction per ICCC customer account (presumably an interest bearing account) for the provider of ICCC system service.

4. Other credit card accounts—a separate joint account for each major credit card company belonging to the ICCC system (MCC-ICCC).

In any city, there would be a member bank affiliated with the lead bank. Each member bank would have the following accounts:

1. A retail account which is a separate account for each retail outlet (RO-ICCC).

2. A suspense account used as a clearing account with the lead bank. It is assumed that a transaction register is located in each retail outlet which can transfer data via telephone Modem (TM) to a central computer.

FIG. 17, is a flow chart indicating how cash debit transaction, i.e., those pertaining to purchases and cash withdrawals are handled by the system. Pressing the debit key on a transaction register lowers the ICCC cash (or credit) balance by the amount of the purchase or cash withdrawn. The retail outlet (RO) is credited on the day of deposit (DOD).

In FIG. 18, cash transactions involving a credit, such as returned items and deposits, are illustrated. Although the Figures are self-explanatory, the following should be noted. After the credit key of a transaction register has been pressed, the ICCC cash or credit balance is raised by the amount of the credit or deposit. For purchases or cash withdrawals, the ICCC cash balance is immediately lowered. Retail outlets are credited on the day of deposit, thereby receiving immediate credit.

Figure 19:
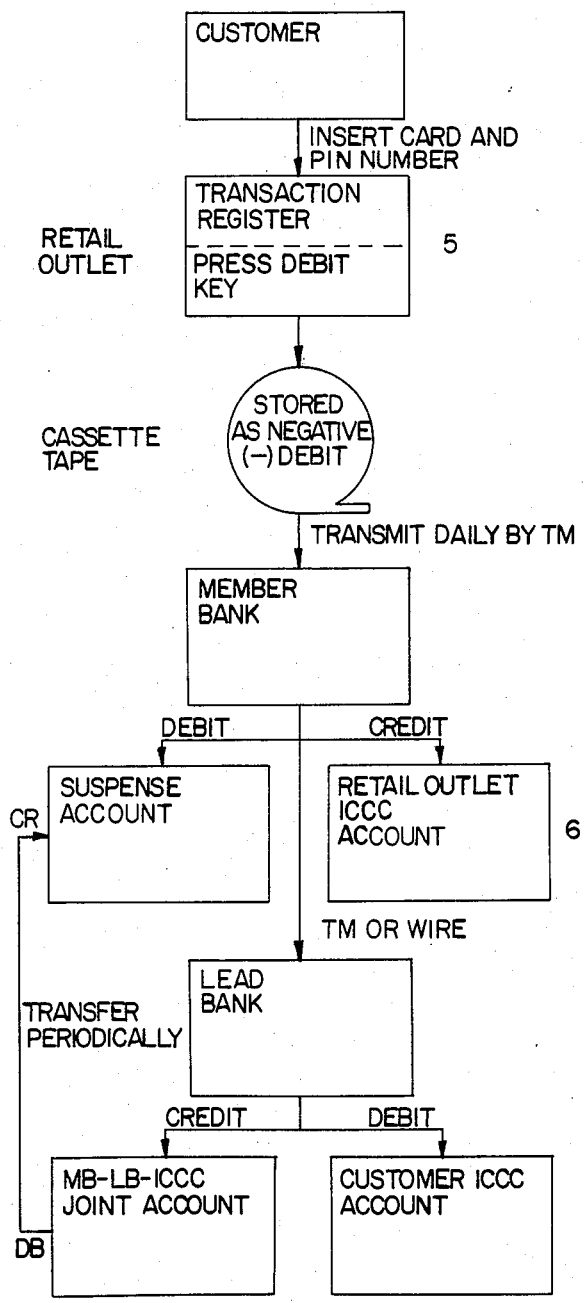
FIG. 19 is a block diagram illustrating cash card transaction processing for debits.
Figure 20:
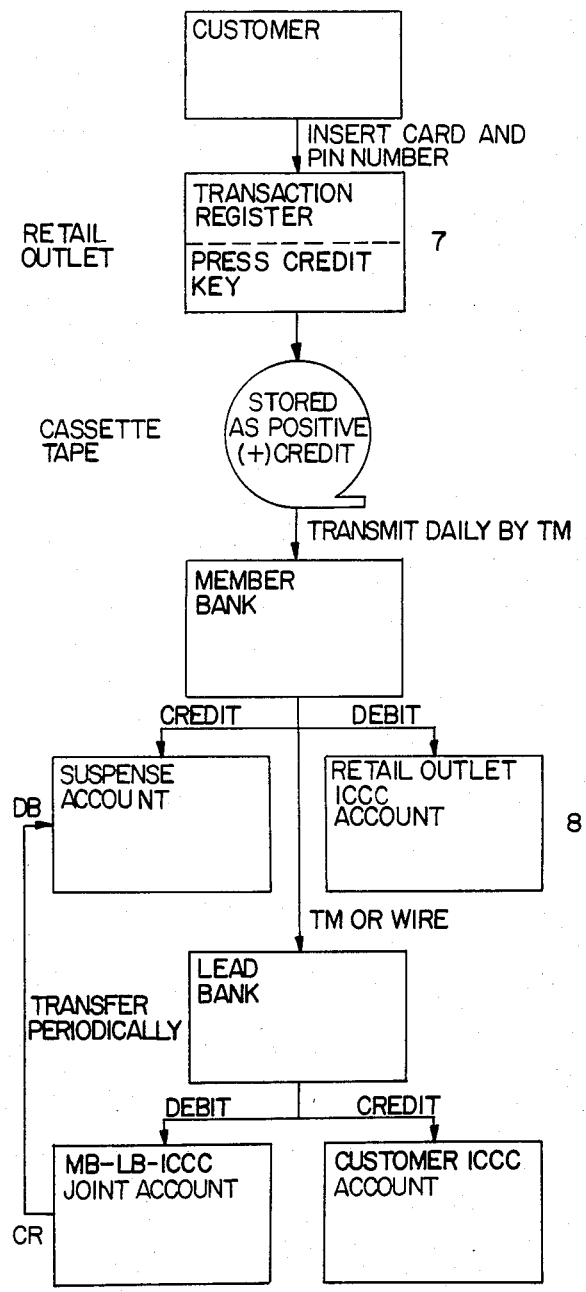
FIG. 20 is a block diagram illustrating cash card transaction processing for credits.

FIG. 19 illustrates the transaction flow for ICCC credit card debit transactions, such as purchases and cash withdrawals and FIG. 20 illustrates the flow of an ICCC credit card transaction for a credit such as a return item or a deposit. For ICCC credit card transactions, the ICCC cash balance on the customer's card is lowered until it reaches zero. Then, the system automatically increases the debit balance until a predetermined ceiling limit is reached. ICCC balances are paid further by a customer's deposit thereby eliminating further interest charged from the date of deposit. A retail outlet can be credited on the day of deposit thereby receiving an immediate credit. The system decreases the retail outlet's debit balance or increases a cash balance. Similarly, a retail outlet can be debited on the same day of a deposit.

Figures 21, 22:
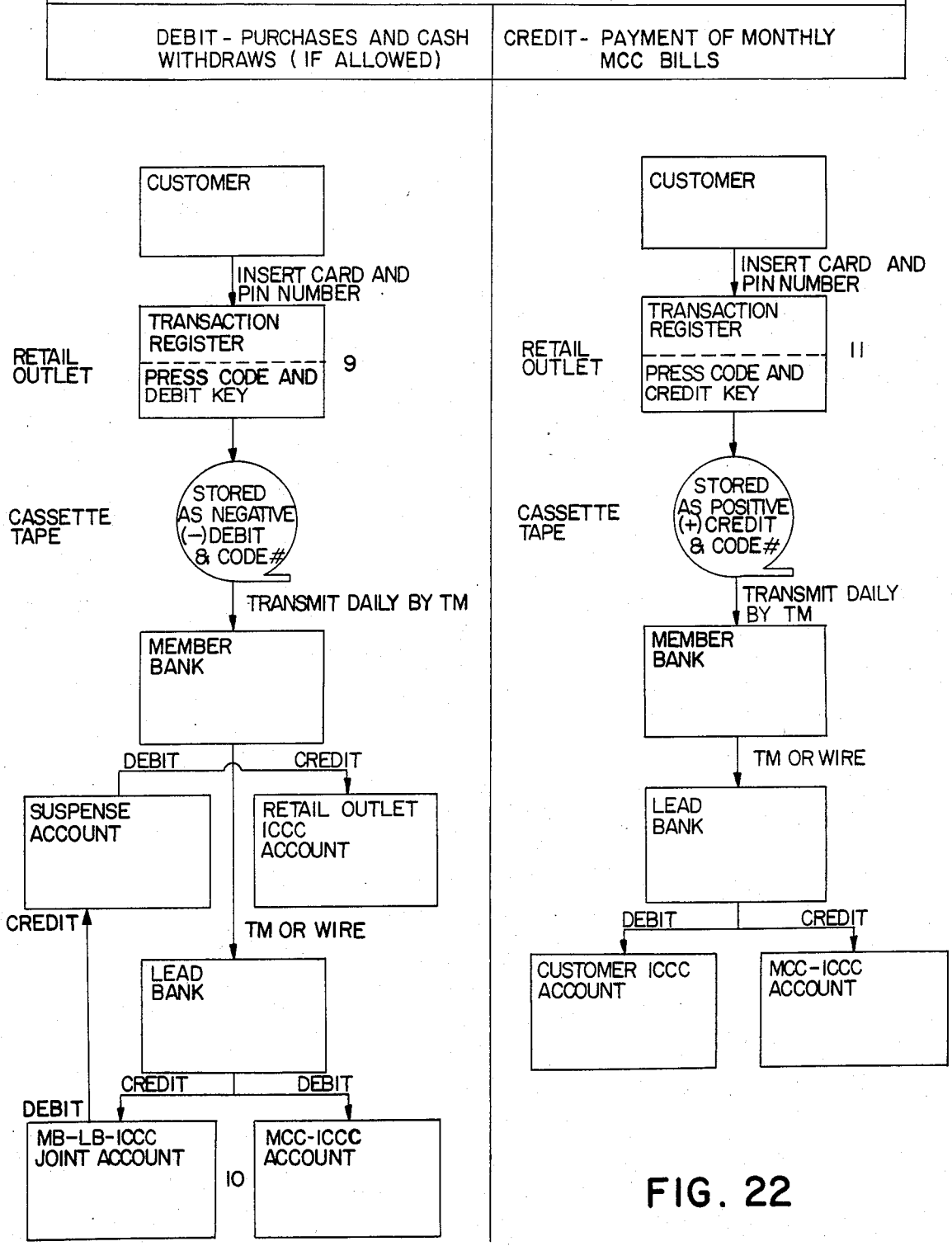
FIG. 21 is a block diagram illustrating major credit card debit transaction processing.
FIG. 22 is a block diagram illustrating major credit card credit transaction processing.

FIGS. 21 and 22 show the flow of a transaction using a major credit card subscriber to the ICCC system. Specifically, FIG. 21 shows the flow of a debit transaction and FIG. 22 shows the flow of a credit transaction. Again, the Figures are self-explanatory. A key code on the transaction register is pressed to designate the appropriate credit card used. This does not affect the ICCC balance. A credit to the "joint account" at Lead Bank is reduced by whatever fee is charged by the major credit card. The system automatically reduces the ICCC "Joint Account" balances at Lead Bank by the amount of any payment.

On purchases, a customer may tell a cashier that he wants to use a particular major credit card and not make a charge against his cash card balance. The cashier presses a code key after the customer inserts his cash card into slot 126. The system displays on the readout that the customer does in fact belong to the major credit card system which the customer wishes to charge.

The cashier can follow the particular rules appropriate to that credit card such as calling a credit card bureau if the purchase is over a predetermined dollar amount. The cashier no longer has to use a multi-carbon copy or a printer. The purchase is made and transmitted to the retail outlet's bank electronically. The retail outlet's bank in turn transmits the total of the transaction to the lead bank. The lead bank has the particular major credit card-ICCC account. When the transaction reaches the lead bank, it goes to the "joint account" which is a non-interest bearing float that belongs to the lead bank and all member banks.

This account is debited by the amount of the purchase and the major credit card account (MCC-ICCC) account is credit. Then the MCC-ICCC account is debited, less any fee to the major credit card company and the joint account is credited. Then, in turn, the joint account is debited and the suspense account at the member bank (retail outlet bank) is credited. The suspense account is debited and the retail outlet account is credited.

This arrangement considerably simplifies the physical transaction including the mailing of checks after many days or processing multi-carbon copies. It reduces the major credit card company's personnel time load cost and expedites the delivery of credit to the retail outlet which encourages participation in the major credit card program. Thus, the system provides a competitive edge. In addition, the major credit card receives payment faster from the customer since it can pay electronically instead of using a logging payment method such as mailing a check and waiting for the check to clear. The only "float" is the joint account at the lead bank which comprises sufficient funds for projected purchases by cash card holders to credit the various retail outlet accounts. Notification of these credits and debits is reflected in the monthly statements from the banks for both customer and retail outlet, eliminating the time-lag cost of paper and mailing the transactions, with the exception of a monthly bill from the major credit card company (MCC). However, such mailing is far less costly than the mailing of checks for payment of credit.

The following summarizes FIGS. 16–22 and various advantages of the cash card system according to the present invention. The cash card customer can not only put a cash or check deposit to his card, but can also have a negative balance up to a ceiling limit just like a major credit card. The customer can pay off this negative balance by a deposit which brings the card total and his account into the "plus" side of his card. Once the cash card customer enters the negative register of his card, from that date, he can be charged interest. The customer can keep his negative balance as long as he wishes, instead of the predetermined time period such as a 90-day limit, required by a major credit card, as long as he does not mind paying the interest.

The customer never gets a bill for purchases because such transactions are immediately deducted from his card. The amount deducted from the cash balance on the card would include the purchase price, any tax, a cash card transaction fee, and any interest due. The new balance in the customer's account would automatically be encoded onto the card at the time of the next transaction.

The customer can find out at any time what he owes or his cash balance by asking the cashier to use the "query key" on a transaction register to display this balance. The customer can deposit enough funds to keep himself within any predetermined financial limits that he may establish. The customer gets immediate feedback that he is paying a particular dollar amount because his available cash balance is displayed to him at each transaction. In essence, a customer pays his bills "as he goes" by making deposits to his cash card.

By processing transactions in the manner shown in FIGS. 17-22, the handling of banking and retail outlet transactions is changed in many ways from the presently used system. The use of checks can be eliminated since a cash card customer can pay a bill directly from his cash card account, electronically. Deposit slips are eliminated. A customer can deposit cash or a check to his card just by handing it to a cashier at any retail outlet. The deposit is encoded via a transaction register directly onto the card and no deposit slip is required. House charge accounts can be replaced by the cash card allowing the customer to pay for products and services directly without incurring any interest charge, if the customer has a cash balance.

The cash card system in effect turns retail outlets into branch banks. This eliminates expensive construction costs and personnel for operating a plurality of branch banks that will no longer be necessary. Retail outlets and customers can bank electronically from any transaction register and its remote unit, the transaction terminal. These terminals can be located in a customer's home and office.

Invoices or bills are eliminated because purchases are paid for at the time of a transaction by debiting a cash card through the transaction register or through a transaction terminal Even retail outlets can order and pay for goods from a wholesaler who has a transaction register. Similarly, a wholesaler can purchase and pay for goods from a manufacturer having a transaction register.

Cash receivables are eliminated because purchases are paid for at the time of the order. The amount of the transaction is deducted electronically from the cash card by a transaction register or terminal. Mailing delays are eliminated since invoices and bills are eliminated along with the need for checks in payment of those bills. In addition, both customers and retail outlets can eliminate lengthy trips to banks. In essence, the system allows for much of the time load cost associated with bank personnel to be transferred to retail outlets where store cashiers take the place of tellers at no cost to the bank.

Even for small operatives such as cabs, movies, buses, telephones, vending machines, etc., a modular transaction register can be installed so that a cash card could be utilized.

The present invention has been described in detail above by means of a specific example and in a specific embodiment for purposes of illustration only and is not intended to be limited by this description or otherwise, except as defined in the appended claims.

*OFF LINE CASH CARD SYSTEM + METHOD*

*APPENDIX A*

```
10000 'SECURITY SUBROUTINES USED IN FIG. 10 BLOCK 526 AND FIG. 13 BLOCKS 600 AND 622
10100 '
10200 '
10300 DEFINT P,K,T,I,L,C
10400 DIM P(49),K(49),T(255)
10500 '
10600 ' LOAD SUBSTITUTION TABLE T
10700 FOR X=0 TO 255 : READ T(X) : NEXT X
10800 '
10900 CALIB=230 ' SET CALIBRATION LEVEL - MAY BE ADJUSTED.
11000 '
11100 'PORT 6 IS PIA 36 INPUT DATA REGISTER.
11200 'PORT 7 IS PIA 36 OUTPUT DATA REGISTER.
11300 'PORT 8 IS PIA 36 INPUT CONTROL REGISTER. WRITING 01 AT PORT 8 RESULTS IN
11400 'A PULSE AT THE PIA 36 CA2 LINE WHICH IS USED AS A STROBE SIGNAL FOR THE
11500 'ANALOG/DIGITAL CONVERTER. AN 80 APPEARING AT PORT 8 INDICATES THAT THE BIAS
11600 'DETECT LINE (CA1) IS ACTIVE.
11700 'PORT 12 IS THE PIA 38 INPUT CONTROL REGISTER. WRITING 01 AT PORT 12 CAUSES
11800 'THE BIAS DETECT LATCH TO BE CLEARED.
11900 'PORT 9 IS PIA 36 OUTPUT CONTROL REGISTER. WRITING 01 AT PORT 9 RESULTS IN
12000 'A PULSE AT THE PIA 36 CB2 LINE WHICH IS USED AS A STROBE SIGNAL FOR THE
12100 'DIGITAL/ANALOG CONVERTER.
12200 '
12300 '
12400 '
12500 'RECORD THE DATA IN THE PLAIN$ VARIABLE USING THE SECURITY TRACK AND AN
12600 'ENCRYPTION ALGORITHM TO PREVENT FRAUD.
12700 '
12800 INPUT "PIN NUMBER ";PIN$
12900 GOSUB 14600 'RECORD RANDOM STRING IN THE SECURITY TRACK.
13000 GOSUB 17100 'READ THE MUTATED RANDOM STRING IN THE SECURITY TRACK INTO KEY.
13100 GOSUB 26000 'ENCRYPT PLAIN$ DATA.
13200 GOSUB 21900 'RECORD P(0)....P(49) TO DATA TRACK.
13300 RETURN
13400 '
13500 '
```

```
13600 'READ THE DATA IN THE DATA TRACK USING THE SECURITY TRACK AND THE PIN AS THE
13700 'DECRYPTION KEYS.
13800 '
13900 INPUT "PIN NUMBER ";PIN$
14000 GOSUB 17100 'READ THE SECURITY TRACK KEY.
14100 GOSUB 22400 'READ THE DATA TRACK INTO P(0)....P(49).
14200 GOSUB 27500 'DECRYPT PLAIN$'USING KEY AND PIN AS DECRYPT KEYS.
14300 BIAS=INP(8) 'IF BIAS = 80 THEN REJECT CARD.
14400 RETURN.
14500 '
14600 'WRITE SECURITY TRACK PROCEDURE. THIS SUBROUTINE ASSUMES THAT THE HARDWARE
14700 'HAS BEEN INITIALIZED AND THAT THE CARD READER/WRITER HAS BEEN ACTIVATED
14800 'AND THE CARD TRANSPORT MECHANISM IS MOVING THE MAGNETIC STRIPE CARD UNDER
14900 'THE RECORD HEAD.
15000 '
15100 FOR X=1 TO 20
15200 A=CALIB
15300 OUT 7,A ' RECORD CALIBRATION PATTERN
15400 OUT 9,1 : GOSUB 23400 : OUT 9,0 ' D/A STROBE PULSE
15500 OUT 7,A-128
15600 OUT 9,1 : GOSUB 23400 : OUT 9,0
15700 NEXT X
15800 OUT 7,255 ' RECORD SYNCH PULSE
15900 OUT 9,1 ' D/A STROBE PULSE
16000 FOR D=1 TO 4600 : NEXT D
16100 '
16200 FOR COUNT=1 TO 256
16300 A=INT(RND*256)
16400 OUT 7,A 'OUTPUT RANDOM INTEGER TO D/A CONVERTER.
16500 OUT 9,1 'PRODUCE D/A STROBE SIGNAL.
16600 GOSUB 23400 ' 2.4 MILISECOND DELAY
16700 OUT 9,0
16800 NEXT COUNT
16900 RETURN
17000 '
17100 'READ SECURITY TRACK PROCEDURE. THIS SUBROUTINE ASSUMES THAT THE CARD TRANS
17200 'PORT MECHANISM WILL MOVE THE CARD UNDER THE REPRODUCE HEAD.
17300 'THIS SUBROUTINE STORES A 50 BYTE NUMERIC STRING THAT WILL LATER BE USED
17400 'AS A DECRYPTION KEY IN THE VARIABLE "KEY".
17500 '
17600 OFFSET=0
17700 FOR D=1 TO 23000 : NEXT D 'SAMPLE MIDDLE OF CALIBRATION PATTERN
17800 FOR X=1 TO 12
17900 OUT 8,1 : GOSUB 22900 : OUT 8,0
18000 AA=INP(6)
18100 IF AA>OFFSET THEN OFFSET=AA 'SET OFFSET BASED ON SAMPLED CALIB PATTERN
18200 NEXT X
18300 '
18400 SYNCH=0
18500 SYNCH=SYNCH+1
18600 IF SYNCH>16 THEN 19000
18700 OUT 8,1 : GOSUB 22900 : OUT 8,0
18800 AA=INP(6) 'TEST IF IN SYNCH PULSE
18900 IF AA>200 THEN 18500 ELSE 18400
19000 OUT 8,1 : OUT 8,0 : AA=INP(6)
19100 IF AA>200 THEN 19000 ' WAIT FOR NEGATIVE EDGE OF SYNCH PULSE
19200 '
19300 FOR COUNT=0 TO 49
19400 A=0
19500 FOR AVG=1 TO 8
19600 OUT 8,1 'PRODUCE A/D STROBE SIGNAL
19700 GOSUB 22900 ' .3 MILISECOND DELAY
19800 OUT 8,0
19900 AA=INP(6) 'READ ANALOG DATA FROM SECURITY TRACK.
20000 A=A+AA
20100 NEXT AVG
20200 K(COUNT)=A/8
20300 'DUMP NEXT 5 ANALOG POINTS
20400 FOR D=1 TO 40
20500 OUT 8,1 'PRODUCE A/D STROBE SIGNAL
20600 GOSUB 22900 ' DELAY
20700 OUT 8,0
20800 NEXT D
20900 NEXT COUNT
21000 '
```

```
21100 'MERGE PIN NUMBER WITH SECURITY KEY K
21200 '
21300 FOR X=1 TO 10
21400 A$=MID$(PIN$,X,1)
21500 IF A$="" THEN 21600 ELSE K((X*5)-1)=ASC(A$)
21600 NEXT X
21700 RETURN
21800 '
21900 'STORE THE CONTENTS OF P(0)....P(49)  IN THE DATA TRACK SUBROUTINE.
22000 'ANY STANDARD ABA OR IATA PROCEDURE MAY BE USED. SEE THE ABA BANK CARD
22100 'STANDARDS MANUAL.
22200 RETURN
22300 '
22400 'READ THE CONTENTS OF THE DATA TRACK TO P(0)....P(49)  SUBROUTINE.
22500 'ANY STANDARD ABA OR IATA PROCEDURE MAY BE USED. SEE THE ABA BANK CARD
22600 'STADARDS MANUAL.
22700 RETURN
22800 '
22900 ' A/D STROBE DELAY SUBROUTINE - THIS SUBROUTINE PRODUCES A .3 MILISECOND
23000 ' DELAY.
23100 FOR DELAY=1 TO 138 : NEXT DELAY
23200 RETURN
23300 '
23400 ' D/A STROBE DELAY SUBROUTINE - THIS SUBROUTINE PRODUCES A 2.4 MILISECOND
23500 ' DELAY.
23600 FOR DELAY=1 TO 1104 : NEXT DELAY
23700 RETURN
23800 '
23900 '
24000 ' ********************* CRYPTOSYSTEM ******************************
24100 '
24200 ' THE FOLLOWING CRYPTOGRAPHIC ALGORITHMS HAVE AS INPUT
24300 '       (1) A 50 BYTE PLAINTEXT STRING P(0),...P(49)
24400 '       (2) A 50 BYTE SECURITY KEY K(0)....K(49) INTO WHICH A 10 BYTE
24500 '           PERSONAL IDENTIFICATION NUMBER (PIN) HAS BEEN MERGED
24600 '       (3) A SECRET 256 BYTE SUBSTITUTION TABLE T(0),...T(255) WHICH
24700 '           IS CONSTRUCTED SO THAT THE TABLE LISTS EACH OF THE BYTES
24800 '           0,...255, BUT IN A HIGHLY RANDOM AND UNPREDICTABLE ORDER.
24900 '           THIS TABLE IS STORED IN MEMORY AND MUST BE PHYSICALLY PRO-
25000 '           TECTED. IN THIS IMPLEMENTATION IT IS STORED AS STANDARD
25100 '           BASIC DATA STATEMENTS.
25200 '
25300 ' THESE ALGORITHMS ARE SIMILAR IN SPIRIT TO THOSE IN THE DATA ENCRYPTION
25400 ' STANDARD; USING A COMBINATION OF SUBSTITUTION AND MIXING OPERATIONS.
25500 ' EACH BIT OF THE CIPHERTEXT DEPENDS IN A VERY COMPLICATED WAY ON ALL OF
25600 ' THE BITS OF THE KEYS K AND T. WITH SUCH A LARGE KEY (256 BYTES) AND
25700 ' THE EXTENSIVE AMOUNT OF TIME DEVOTED TO THE ENCRYPTION, THIS ALGORITHM
25800 ' IS SUBSTANTIALLY MORE SECURE THAN THE DATA ENCRYPTION STANDARD.
25900 '
26000 ' ENCRYPTION ALGORITHM
26100 '
26200 FOR X=1 TO 50
26300 A$=MID$(PLAIN$,X,1) : IF A$="" THEN A$=" "
26400 P(X-1)=ASC(A$)  ' LOAD P(0)....P(49) WITH PLAIN$
26500 NEXT X
26600 '
26700 I=49 : COUNT=100 : L=P(0)
26800 L=P(I) XOR T(T(COUNT) XOR T(L XOR K(I)))
26900 P(I)=L
27000 IF I=0 THEN I=50 : COUNT=COUNT-1
27100 I=I-1
27200 IF COUNT>0 THEN 26800
27300 RETURN
27400 '
27500 ' DECRYPTION ALGORITHM
27600 '
27700 I=0 : COUNT=1 : L=P(1)
27800 IF I=49 THEN L=P(0) ELSE L=P(I+1)
27900 P(I)=P(I) XOR T(T(COUNT) XOR T(L XOR K(I)))
28000 I=I+1
28100 IF I=50 THEN I=0 : COUNT=COUNT+1
28200 IF COUNT<101 THEN 27800
28300 '
28400 FOR X=1 TO 50
28500 PLAIN$=PLAIN$+CHR$(P(X-1)  ' LOAD PLAIN$ WITH P(0)....P(49)
```

```
28600 NEXT X
28700 '
28800 RETURN
28900 '
29000 ' SUSTITUTION TABLE T
29100 DATA  200,  29,  17, 141, 132,  13,  25,  49, 165, 193, 244, 248
29200 DATA  134, 188, 107, 151, 215, 123,  89, 144, 229, 168,   4,  27
29300 DATA  240, 201, 103, 187,  37, 106, 251,  86, 182, 184,  26,  24
29400 DATA  210, 180,  71, 148, 143,  45,  20,  96, 162,  53,  36,  81
29500 DATA    7, 161,  85, 164, 163,  80, 255, 185, 101,  67,  50, 198
29600 DATA   32,  84,  33, 242, 175, 183, 117,   1,  23, 150, 136,  88
29700 DATA  115,  22, 119,  35, 135,  87, 190,  55,  43, 225, 252, 174
29800 DATA  179, 239, 209,  41, 156, 138, 158,  64,  40,  69, 142, 233
29900 DATA  228,  15, 247,  62, 217, 219, 124, 216, 235, 129,  54, 157
30000 DATA  133, 245,  28, 249,  97, 189, 127, 173,  38,   0, 243, 118
30100 DATA  167,  65,  95,  12, 172, 186, 203, 220, 153, 205,  44, 234
30200 DATA  207, 116, 211,  51, 171,   8, 160, 126,   2,  91, 114, 227
30300 DATA  199, 214, 231, 170, 109, 121,  19, 166, 181,  76, 137, 195
30400 DATA   57, 254,  82,   5, 149, 112,  52, 120, 159, 108, 230,  83
30500 DATA   68,  70, 221,  47, 191,  30, 104,  14,  78,  42, 128, 196
30600 DATA  122, 224,  11, 105, 253, 139, 218, 176, 125, 111,  31, 197
30700 DATA  212,  39, 152,  79,  72,  48,  63, 155,  93, 102, 110, 208
30800 DATA  222, 192,  60,  56, 131, 241,  16,   9,  75,  90, 202,  59
30900 DATA   74, 246, 147,  77, 223,  98,  10,   3,  92, 154,  21,  94
31000 DATA  113, 232, 213,  34, 206, 178, 226, 236,   6, 237, 130, 194
31100 DATA   18, 169, 204,  46,  61,  66, 238,  99, 250,  58, 146, 100
31200 DATA   73, 177, 140, 145
31300 '
31400 ' ************************************************************
```

OFF LINE CASH CARD SYSTEM AND METHOD

Appendix B

The following is an example of the use of the system according to the principles of the invention.

PLAINTEXT ? THIS IS A TEST MESSAGE
PIN ? 123456

PLAINTEXT (THIS IS A TEST MESSAGE)
```
 84     72     73     83     32     73     83     32
 65     32
 84     69     83     84     32     77     69     83
 83     65
 71     69     32     32     32     32     32     32
 32     32
 32     32     32     32     32     32     32     32
 32     32
 32     32     32     32     32     32     32     32
 32     32
```

CIPHERTEXT
```
241    132     34    245    229     24     60     71
 82    105
214     41     93    227    156    215    161     52
187    207
105    253    198     64     85      5    145    189
162     70
226     61     99     76     23    216     86    159
254    197
253     23    203     14    116     79    229     25
241    223
```

DECRYPTED CIPHERTEXT
```
 84     72     73     83     32     73     83     32
 65     32
 84     69     83     84     32     77     69     83
 83     65
 71     69     32     32     32     32     32     32
 32     32
 32     32     32     32     32     32     32     32
 32     32
 32     32     32     32     32     32     32     32
 32     32
```

```
PLAINTEXT ? THIS IS A TEST MESSAGE
PIN ? 123457

PLAINTEXT (THIS IS A TEST MESSAGE)
   84      72      73      83      32      73      83      32
   65      32
   84      69      83      84      32      77      69      83
   83      65
   71      69      32      32      32      32      32      32
   32      32
   32      32      32      32      32      32      32      32
   32      32
   32      32      32      32      32      32      32      32
   32      32

CIPHERTEXT
  249     217     247     105     193      37     216      92
   69      43
  131      82     248      36      26     222     117     107
   68      25
   92     127     199      10      45      15      23      71
  126      13
  120     181     167     227     251     218      70     144
  185      95
  152     104     218     101     148      61     157     224
  241     117

DECRYPTED CIPHERTEXT
   84      72      73      83      32      73      83      32
   65      32
   84      69      83      84      32      77      69      83
   83      65
   71      69      32      32      32      32      32      32
   32      32
   32      32      32      32      32      32      32      32
   32      32
   32      32      32      32      32      32      32      32
   32      32

PLAINTEXT ?
```

We claim:

1. An electronic fund transfer system for handling a card bearer's fund transfer transaction in a trade sale, comprising:

a cash card having machine sensitive information recorded thereon, including information representing an available cash balance in an account of the bearer, and a randomly mutated first enciphering key; and a transaction register machine at the location of trade sale including means for receiving said cash card from said bearer and recording information to and reading information from said cash card, randomly generating said first enciphering key and recording said first enciphering key on said cash card with a random mutation by recording with no a.c. or d.c. bias and no saturation, receiving personal identification number (PIN) data from said bearer independent of said cash card, said PIN data constituting a second enciphering key, enciphering and deciphering data to be recorded on and read from said cash card using said first and second enciphering keys, verifying the validity of said cash card is an authorized card bearer by determining whether said received PIN data successfully deciphers information previously enciphered and recorded onto the card, modifying said available cash balance and other information recorded on said cash card in accordance with said transaction, and magnetically recording and storing information of the trade sale cash transaction for later processing.

2. A system according to claim 1, wherein said data processing center includes an automatic magnetic tape reader for reading the information on said tape.

3. A system according to claim 2, wherein said data processing center includes a disk file for maintaining permanent records of personal identification numbers of lost, stolen and voided cash cards.

4. A system according to claim 1, further comprising modem means, connected to said transaction register machine, for transmitting information of the cash card transactions by telephone to the data processing center for updating the cash balance in the respective accounts accordingly.

5. A system according to claim 1, wherein said magnetic recording means comprises a disk for storing thereon all cash card transactions at said transaction register machine.

6. A system according to claim 4, further comprising a timer for presetting a certain time for the transmitting of information of each transaction from said magnetic recording means to the data processing center via a telephone line.

7. A system according to claim 1, wherein said enciphering means includes:

means for combining said first and second enciphering keys in a random sequence generator array to produce a first pseudo-random string;

means for modifying data to be enciphered using said first pseudo-random string;

means for transforming said first pseudo-random string into a second pseudo-random string; and means for scrambling components of the data to be enciphered using said second pseudo-random string as a key to the new position of each of said components.

8. A system according to claim 7, wherein said transaction register machine includes means for programming said machine to decipher said enciphered coded information stored on said cash card.

9. A system according to claim 1, wherein said means for receiving PIN data comprises a keyboard operable by the card bearer.

10. A system according to claim 9, wherein said transaction register machine includes a main keyboard operable by the seller and responsive to the entry of the correct identification number for selectively entering the cash amounts of each transaction in said register machine which in turn records the new cash balance on said cash card and simultaneously records said cash transaction on said magnetic recording means for delivery to a data processing center for transferring the information thereon to the respective cash card accounts.

11. A system according to claim 9, wherein said cash card bearer operable keyboard includes a slot for inserting said cash card thereby engaging said cash card with said transaction register.

12. A system according to claim 10, wherein said seller operable main keyboard includes a query key for displaying the cash balance on said cash card, an enter key for entering the amount of the sale into said register machine, a sale key for displaying the total amount of the transaction, a credit key and a debit key, a code key and arithmetic functions keys for selecting the operation of said register machine in completing the sale transaction.

13. A system according to claim 12, wherein said seller operable main keyboard has display windows for displaying by lighting a personal identification number error, a void card, and other information for security and for operation of said transaction register machine.

14. An electronic fund transfer system for carrying out cash transfer transactions in business and trade sale dealings comprising:

a plastic card having a magnetic stripe containing information representing an available cash balance and other information including a first enciphering key recorded with no a.c. or d.c. bias and no saturation;

a transaction cash register machine for register recording an amount of money received and exhibiting an amount of each sale, said transaction cash register machine including means for reading said magnetic stripe, means for verifying the validity of said card, means for verifying that a user of said card is an authorized card bearer, means for modifying said cash balance and other information recorded on said magnetic stripe, and means for magnetically recording and storing information of each transaction for further processing at a data processing center.

15. A system of claim 12, further comprising a data processing center including a computer unit, an automatic cassette tape or disk reader, a disk file and a printer for maintaining records of the cash card system transactions.

16. The system according to claim 13, wherein said cash transaction register machine is interconnected with a data processing center by a data transmission network.

17. The system according to claim 14, wherein said transaction register machine includes a main keyboard operable by the seller and responsive to the entry of the correct identification number in for selectively entering the cash amounts of each transaction in said register machine which in turn records the new cash balance on said cash card and simultaneously records said cash transaction on said magnetic recording means for delivery to the data processing center for transferring the information thereon to the respective cash card accounts.

18. A system according to claim 17, wherein said seller operable main keyboard includes a query key for displaying the cash balance on a cash card, an enter key for entering the amount of the sale in said register machine, a sale key for displaying the total amount of the transaction, a credit key and a debit key, a code key and arithmetic functions keys for selecting the operation of said register machine in completing the sale transaction.

19. A system according to claim 18, wherein said seller operable main keyboard has display windows for displaying with tight emitting elements a personal identification number error, a void card, and other information for security and for operation of said transaction register machine.

20. An electronic fund transfer system for transferring funds from a bearer's to a transferee's account comprising:

a card having enciphered information recorded thereon including at least an available cash balance and a first enciphering key recorded with no a.c. or d.c. bias and no saturation to carry out a money transfer transaction independent of any other source of information, and a cash card terminal machine including means for reading, recording, and displaying said information on said card.

21. A cash card system according to claim 20, wherein said cash card terminal machine includes means for transmitting said recorded information through a telephone line to a transaction register machine for carrying out the cash transfer transaction.

22. A cash card system according to claim 21, further comprising a transaction register machine which includes means for reading information recorded on said cash card, enciphering and deciphering data, verifying the validity of said cash card, verifying that a user of said cash card is an authorized card bearer, and modifying said information recorded on said cash card.

23. A cash card system according to claim 22, wherein said register machine includes magnetic recording means for permanently storing information regarding said cash transaction thereon.

24. A cash card system according to claim 20 further comprising a keyboard for entering a personal identification number.

25. A method of uniquely identifying a card by enciphering information thereon comprising the steps of:
 randomly generating a digital number,
 converting said digital number to an analog signal, and
 recording said analog signal onto said card with a random mutation by recording with no a.c. or d.c. bias and no saturation.

26. A method of verifying the validity any one of a plurality of presented cards each having information enciphered thereon in an analog signal comprising the steps of:
 reading said analog signal from said card, and
 determining whether said analog signal contains any a.c. or d.c. bias.

27. A method of verifying that a user of an electronic fund transfer system card is an authorized card bearer, comprising the steps of:
 (a) upon a first presentation of said card to the system,
 randomly generating a digital number;
 converting said digital number to an analog signal;
 recording said analog signal onto said card with a random mutation by recording with no a.c. or d.c. bias and no saturation;
 reading said randomly mutated analog signal from said card;
 converting said randomly mutated analog signal to a digital representation thereof; and
 using said digital representation as a first enciphering key along with personal identification number (PIN) data supplied by said user as a second enciphering key to encipher onto said card an identifying datum which is uniformly used throughout said system, and
 (b) and upon a subsequent presentation of said card to the system,
 reading said enciphered identifying datum from said card;
 reading said randomly mutated analog signal from said card;
 converting said randomly mutated analog signal to a digital representation thereof; and
 using said digital representation as a first enciphering key along with PIN data supplied by said user as a second enciphering key to attempt to decipher said identifying datum,
 whereby a successful deciphering of said identifying datum indicates that said user is an authorized card bearer.

28. A method of enciphering and recording onto a card information used in an electronic fund transfer system, including an available cash balance, comprising the steps of:
 randomly generating a digital number;
 converting said digital number to an analog signal;
 recording said analog signal onto said card with a random mutation by recording with no a.c. or d.c. bias and no saturation;
 reading said randomly mutated analog signal from said card;
 converting said randomly mutated analog signal to a digital representation thereof;
 using said digital representation as a first enciphering key along with personal identification number (PIN) data supplied by a bearer of said card as a second enciphering key to encipher said electronic fund transfer system information; and
 recording said enciphered information onto said card.

29. A method according to claim 28, wherein said steps are repeated with each subsequent use of said card.

* * * * *